(12) United States Patent
Nishino

(10) Patent No.: US 11,947,049 B2
(45) Date of Patent: Apr. 2, 2024

(54) LIGHT RECEIVING ELEMENT AND RANGING SYSTEM

(71) Applicant: Sony Semiconductor Solutions Corporation, Kanagawa (JP)

(72) Inventor: Tatsuki Nishino, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 496 days.

(21) Appl. No.: 17/274,509

(22) PCT Filed: Sep. 4, 2019

(86) PCT No.: PCT/JP2019/034718
§ 371 (c)(1),
(2) Date: Mar. 9, 2021

(87) PCT Pub. No.: WO2020/059488
PCT Pub. Date: Mar. 26, 2020

(65) Prior Publication Data
US 2021/0341591 A1 Nov. 4, 2021

(30) Foreign Application Priority Data
Sep. 18, 2018 (JP) ................. 2018-173555

(51) Int. Cl.
*G01S 7/497* (2006.01)
*G01S 7/4863* (2020.01)
*H04N 25/60* (2023.01)
*H04N 25/77* (2023.01)
*G01S 17/931* (2020.01)

(52) U.S. Cl.
CPC ............ *G01S 7/497* (2013.01); *G01S 7/4863* (2013.01); *H04N 25/60* (2023.01); *H04N 25/77* (2023.01); *G01S 17/931* (2020.01)

(58) Field of Classification Search
CPC ...... G01S 7/497; G01S 7/4863; G01S 17/931; G01S 7/4865; H04N 25/60; H04N 25/77;
(Continued)

(56) References Cited

U.S. PATENT DOCUMENTS

| 8,901,475 B1 | 12/2014 | Joffe |
| 2013/0009266 A1 | 1/2013 | Sato |

(Continued)

FOREIGN PATENT DOCUMENTS

| CN | 102110697 A | 6/2011 |
| JP | 2018-88488 A | 6/2018 |
| JP | 2018-88494 A | 6/2018 |

OTHER PUBLICATIONS

International Search Report (PCT/ISA/210), International Application No. PCT/JP2019/034718, dated Nov. 6, 2019.

(Continued)

*Primary Examiner* — Tony Ko
(74) *Attorney, Agent, or Firm* — Michael Best & Friedrich LLP

(57) ABSTRACT

The present technology relates to a light receiving element and a ranging system capable of improving a pixel characteristic by responding to a change in a breakdown voltage due to a temperature change.

The light receiving element includes: a pixel array in which a plurality of pixels each including an SPAD is arranged in a matrix; a pixel drive unit that controls each pixel is the pixel array to be an active pixel or an inactive pixel; a leakage current detection unit that detects a leakage current of the inactive pixel; and a voltage control unit that controls a voltage supplied to a side of an anode or a side of a cathode of the SPAD such that the leakage current has a current value within a predetermined range. The present technology can (Continued)

be applied to, for example, a ranging system or the like that detects a distance to a subject in a depth direction.

11 Claims, 17 Drawing Sheets

(58) Field of Classification Search
CPC ... H04N 25/709; H01L 27/14609; G01C 3/06
See application file for complete search history.

(56) References Cited

U.S. PATENT DOCUMENTS

| | | |
|---|---|---|
| 2014/0191115 A1 | 7/2014 | Webster |
| 2016/0284743 A1 | 9/2016 | Mellot et al. |
| 2018/0151758 A1 | 5/2018 | Morimoto et al. |
| 2018/0164415 A1 | 6/2018 | Buckley |
| 2018/0180470 A1 | 6/2018 | Seitz |
| 2019/0189827 A1* | 6/2019 | Haraguchi ........... H04N 25/709 |
| 2019/0252442 A1 | 8/2019 | Tanaka et al. |

OTHER PUBLICATIONS

Notification of Transmittal of the International Search Report and the Written Opinion of the International Searching Authority, or the Declaration (PCT/ISA/220), International Application No. PCT/JP2020/034718, dated Nov. 19, 2019.
Chinese Notice of Allowance dated Jan. 6, 2024 for corresponding Chinese Application No. 201980059385X.

* cited by examiner

LIGHT RECEIVING ELEMENT AND RANGING SYSTEM

TECHNICAL FIELD

The present technology relates to a light receiving element and a ranging system, and particularly relates to a light receiving element and a ranging system capable of improving a pixel characteristic by responding to a change in a breakdown voltage due to a temperature change.

BACKGROUND ART

A range image sensor that performs distance measurement by a time-of-flight (ToF) method has recently attracted attention. The range image sensor adopts, for example, a pixel array in which pixels using single photon avalanche diodes (SPADs) are arranged in a matrix. In the SPAD, avalanche amplification occurs when a single photon enters a PN junction region of a high electric field while a voltage higher than a breakdown voltage is applied. The distance can be measured with high accuracy by detecting the timing of the current flowing momentarily at that time.

The range image sensor in which the pixels using the SPADs are arranged in a matrix is driven such that some of the pixels are set as active pixels that detect a photon while the rest of the pixels are set as inactive pixels that do not detect a photon (see Patent Document 1, for example).

Patent Document 1: U.S. Patent Application. Publication No. 2016/0284743

SUMMARY OF THE INVENTION

Problems to be Solved by the Invention

The pixel set as the inactive pixel is controlled not to respond even when light enters the pixel by setting an anode-cathode voltage of the SPAD to be lower than or equal to the breakdown voltage. However, the breakdown voltage of the SPAD varies with temperature changes and individual differences so that, in the pixel controlled to be the inactive pixel, the anode-cathode voltage of the SPAD may not be lower than or equal to the breakdown voltage, and a leakage current may flow in response to a photon.

The present technology has been made in view of such circumstances, and aims to be able to improve a pixel characteristic by responding to a change in a breakdown voltage due co a temperature change.

Solutions to Problems

A light receiving element according to a first aspect of the present technology includes: a pixel array in which a plurality of pixels each including an SPAD is arranged in a matrix; a pixel drive unit that controls each pixel in the pixel array to be an active pixel or an inactive pixel; a leakage current detection unit that detects a leakage current of the inactive pixel; and a voltage control unit that controls a voltage supplied to a side of an anode or a side of a cathode of the SPAD such that the leakage current has a current value within a predetermined range.

A ranging system according to a second aspect of the present technology includes: a lighting device that emits emitted light; and a light receiving element that receives reflected light or the emitted light, in which the light receiving element includes: a pixel array in which a plurality of pixels each including an SPAD is arranged in a matrix; a pixel drive unit that controls each pixel in the pixel array to be an active pixel or an inactive pixel; a leakage current detection unit that detects a leakage current of the inactive pixel; and a voltage control unit that controls a voltage supplied to a side of an anode or a side of a cathode of the SPAD such that the leakage current has a current value within a predetermined range.

In the light receiving element of the first and second aspects of the present technology, each pixel in the pixel array, in which the plurality of pixels each including the SPAD is arranged in a matrix, is controlled to be the active pixel or the inactive pixel, the leakage current of the inactive pixel is detected, and the voltage supplied to the side of the anode or the side of the cathode of the SPAD is controlled such that the leakage current has the current value within the predetermined range.

The light receiving element and the ranging system may each be an independent device or a module incorporated in another device.

MODE FOR CARRYING OUT THE INVENTION

Figure 1:
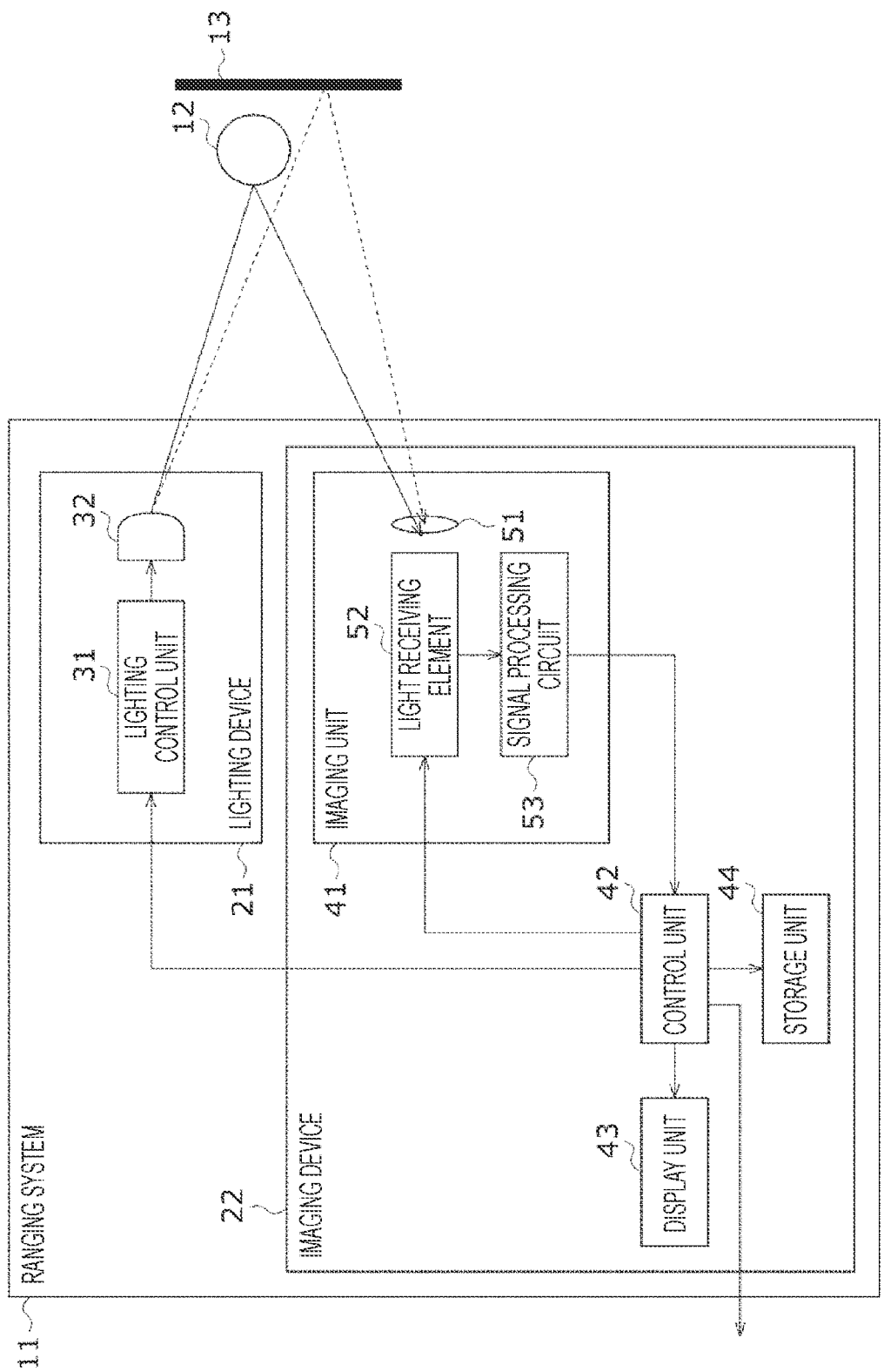
FIG. 1 is a block diagram illustrating an example of a configuration of an embodiment of a ranging system to which the present technology is applied.

In the following, a mode for carrying out the present technology (hereinafter referred to as an embodiment) will be described. Note that the description will be made in the following order.

1. Example of configuration of ranging system
2. Example of configuration of light receiving element
3. Example of configuration of pixel circuit
4. Problem due to variation in breakdown voltage VBD
5. Example of setting active pixels and inactive pixels
6. First configuration example of voltage control circuit
7. Second configuration example of voltage control circuit
8. Third configuration example of voltage control circuit
9. Fourth configuration example of voltage control circuit
10. Example of use of ranging system
11. Example of application to mobile body

1. Example of Configuration of Ranging System

FIG. 1 is a block diagram illustrating an example of a configuration of an embodiment of a ranging system to which the present technology is applied.

A ranging system 11 is a system that captures a range image using a ToF method, for example. Here, the range image is an image formed by a range pixel signal based on a distance in a depth direction from the ranging system 11 to a subject detected for each pixel.

The ranging system 11 includes a lighting device 21 and an imaging device 22.

The lighting device 21 includes a lighting control unit 31 and a light source 32.

The lighting control unit 31 controls a light emission pattern of the light source 32 under the control of a control unit 42 of the imaging device 22. Specifically, the lighting control unit 31 controls the light emission pattern of the light source 32 according to an emission code included in an emission signal supplied from the control unit 42. For example, the emission code includes two values, 1 (high) and 0 (low), and the lighting control unit 31 performs control to turn on the light source 32 when the emission code has the value of "1", or to turn off the light source 32 when the emission code has the value of "0".

The light source 32 emits light in a predetermined wavelength range under the control of the lighting control unit 31. The light source 32 includes, for example, an infrared laser diode. Note that the type of the light source 32 and the wavelength range of the emitted light can be arbitrarily set according to the intended use or the like of the ranging system 11.

The imaging device 22 is a device that receives reflected light of the light (emitted light) emitted from the lighting device 21, the reflected light being reflected by a subject 12, a subject 13, and the like. The imaging device 22 includes an imaging unit 41, the control unit 42, a display unit 43, and a storage unit 44.

The imaging unit 41 includes a lens 51, a light receiving element 52, and a signal processing circuit 53.

The lens 51 causes an image of incident light to be formed on a light receiving surface of the light receiving element 52. Note that the configuration of the lens 51 is arbitrary, and, for example, the lens 51 can include a plurality of lens groups.

The light receiving element 52 includes, for example, a sensor using a single photon avalanche diode (SPAD) in each pixel. The light receiving element 52 receives the reflected light from the subject 12, the subject 13, and the like under the control of the control unit 42, and supplies a pixel signal obtained as a result to the signal processing circuit 53. This pixel signal represents a digital count value that counts the time from when the lighting device 21 emits the emitted light to when the light receiving element 52 receives the light. A light emission timing signal indicating the timing at which the light source 32 emits light is also supplied to the light receiving element 52 from the control unit 42.

The signal processing circuit 53 processes the pixel signal supplied from the light receiving element 52 under the control of the control unit 42. For example, the signal processing circuit 53 detects a distance to the subject for each pixel on the basis of the pixel signal supplied from the light receiving element 52, and generates a range image indicating the distance to the subject for each pixel. Specifically, the signal processing circuit 53 acquires the time (count value) from when the light source 32 emits light to when each pixel of the light receiving element 52 receives the light a plurality of times (for example, several thousands to several tens of thousands of times) for each pixel. The signal processing circuit 53 creates a histogram corresponding to the time acquired. Then, the signal processing circuit 53 detects a peak of the histogram to determine the time it takes for the light emitted from the light source 32 to be reflected by the subject 12 or the subject 13 and returned. Moreover, the signal processing circuit 53 performs a calculation to obtain a distance to an object on the basis of the time determined and the speed of light. The signal processing circuit 53 supplies the range image generated to the control unit 42.

The control unit 42 includes, for example, a control circuit, a processor, or the like such as a field programmable gate array (FPGA), a digital signal processor (DSP), or the like. The control unit 42 controls the lighting control unit 31 and the light receiving element 52. Specifically, the control unit 42 supplies the emission signal to the lighting control unit 31 and also supplies the light emission timing signal to the light receiving element 52. The light source 32 emits the emitted light according to the emission signal. The light emission timing signal may be the emission signal supplied to the lighting control unit 31.

Furthermore, the control unit 42 also supplies the range image acquired from the imaging unit 41 to the display unit 43, and causes the display unit 43 to display the range image. Moreover, the control unit 42 causes the storage unit 44 co store the range image acquired from the imaging unit 41. Furthermore, the control unit 42 further outputs the range image acquired from the imaging unit 41 to the outside.

The display unit 43 includes a panel display device such as a liquid crystal display device or an organic electro luminescence (EL) display device, for example.

The storage unit 44 can include any storage device, storage medium, or the like to store the range image and the like.

2. Example of Configuration of Light Receiving Element

Figure 2:
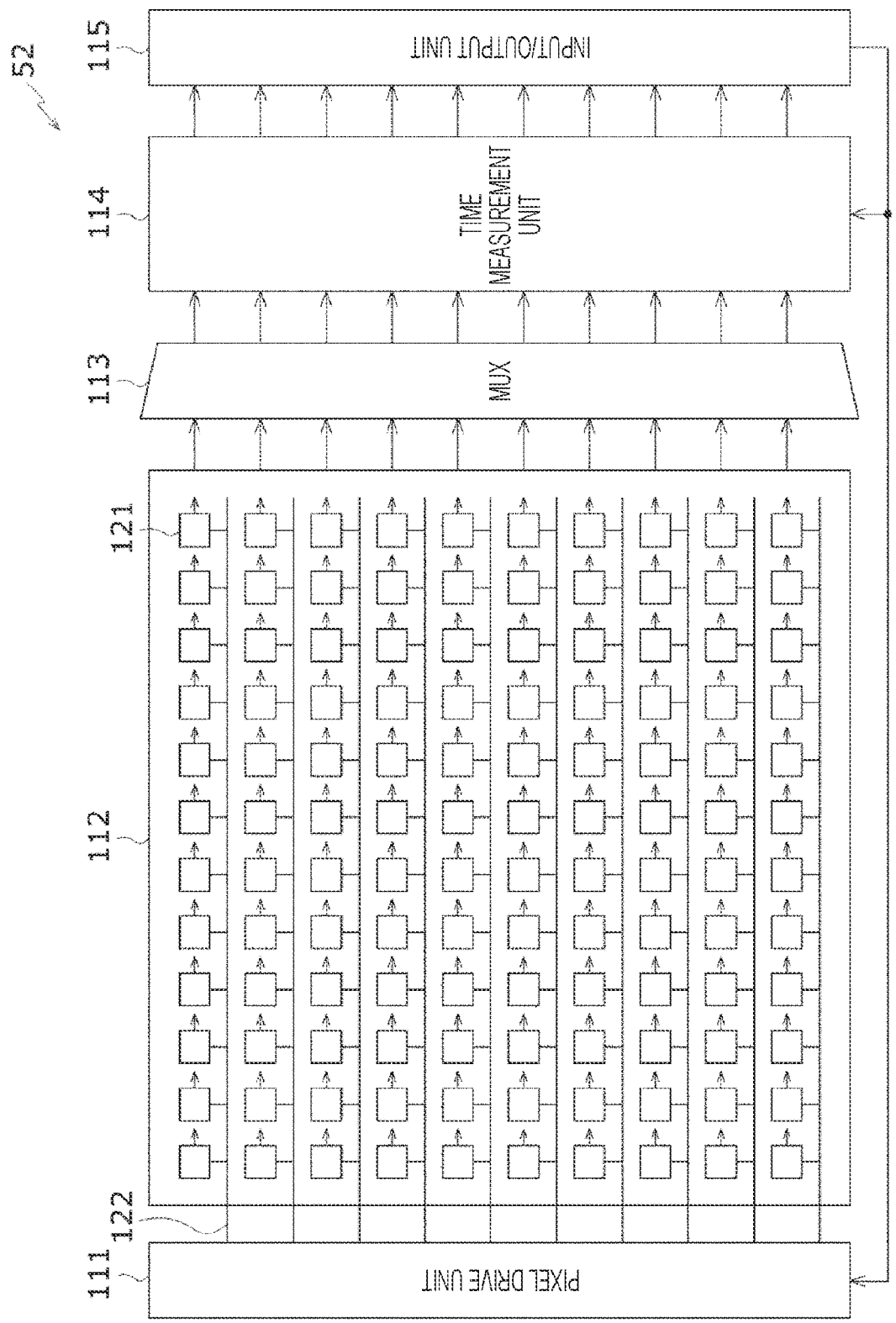
FIG. 2 is a block diagram illustrating an example of a configuration of a light receiving element in FIG. 1.

FIG. 2 is a block diagram illustrating an example of a configuration of the light receiving element 52.

The light receiving element 52 includes a pixel drive unit 111, a pixel array 112, a multiplexer (MUX) 113, a time measurement unit 114, and an input/output unit 115.

The pixel array 112 has a configuration in which pixels 121 that detect the incidence of a photon and output a detection signal, which indicates a result of the detection, as a pixel signal are two-dimensionally arranged in a matrix in a row direction and a column direction. Here, the row direction refers to a direction of arrangement of the pixels 121 in a pixel row, that is, a horizontal direction, and the column direction refers to a direction of arrangement of the pixels 121 in a pixel column, that is, a vertical direction.

FIG. 2 illustrates the pixel array 112 in a pixel array configuration having 10 rows and 12 columns due to space limitations, but the number of rows and The number of columns in the pixel array 112 are not limited thereto and are arbitrary.

A pixel drive line 122 is wired along the horizontal direction for every pixel row with respect to the matrix pixel arrangement of the pixel array 112. The pixel drive line 122 transmits a drive signal for driving the pixel 121. The pixel drive unit 111 drives each pixel 121 by supplying a predetermined drive signal to each pixel 121 via the pixel drive line 122. Specifically, the pixel drive unit 111 performs control to set a part of the plurality of pixels 121 two-dimensionally arranged in a matrix as active pixels and the remaining part thereof as inactive pixels at a predetermined timing corresponding to the light emission timing signal suppled from the outside via the input/output unit 115. The active pixel a pixel that detects the incidence of a photon, and the inactive pixel is a pixel that does not detect the incidence of a photon. A detailed configuration of the pixel 121 will be described later.

Note that although illustrated as one wire in FIG. 2, the pixel drive line 122 may include a plurality of wires. One end of the pixel drive line 122 is connected to an output end of the pixel drive unit 111 corresponding to each pixel row.

The MUX 113 selects output from the active pixel according to switching between the active pixel and the inactive pixel in the pixel array 112. Then, the MUX 113 outputs the pixel signal input from the active pixel selected to the time measurement unit 114.

The time measurement unit 114 generates a count value corresponding to the time from when the light source 32 emits light to when the active pixel receives the light, on the basis of the pixel signal of the active pixel supplied from the MUX 113 and the light emission timing signal indicating the light emission timing of the light source 32. The time measurement unit 114 is also called a time to digital converter (TDC). The light emission timing signal is supplied from the outside (the control unit 42 of the imaging device 22) via the input/output unit 115.

The input/output unit 115 outputs the count value of the active pixel, which is supplied from the time measurement unit 114, as a pixel signal to the outside (the signal processing circuit 53). Furthermore, the input/output an it 115 further supplies the light emission timing signal, which is supplied from the control unit 42, to the pixel drive unit 111 and the time measurement unit 114.

3. Example of Configuration of Pixel Circuit

Figure 3:
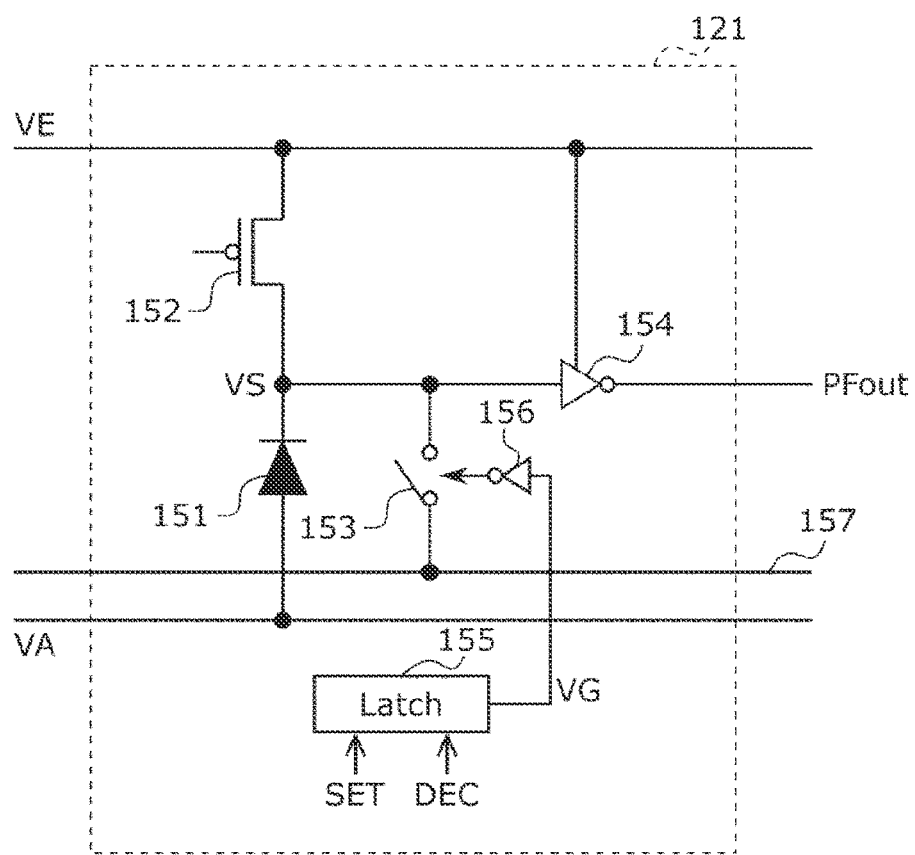
FIG. 3 is a diagram illustrating an example of a circuit configuration of a pixel.

FIG. 3 illustrates an example of a circuit configuration of one of the plurality of pixels 121 arranged in a matrix in the pixel array 112.

The pixel 121 in FIG. 3 includes an SPAD 151, a transistor 152, a switch 153, and an inverter 154. Furthermore, the pixel 121 also includes a latch circuit 155 and an inverter 156. The transistor 152 includes a PMOS transistor.

A cathode of the SPAD 151 is connected to a drain of the transistor 152, and is also connected to an input terminal of the inverter 154 and one end of the switch 153. An anode of the SPAD 151 is connected to a power supply voltage VA (hereinafter also referred to as an anode voltage VA).

The SPAD 151 is a photodiode (single photon avalanche photodiode) that causes avalanche amplification of electrons generated at the time of incidence of incident light, and outputs a signal of a cathode voltage VS. The power supply voltage VA supplied to the anode of the SPAD 151 is, for example, a negative bias (negative potential) of about −20 V.

The transistor 152 is a constant current source that operates in a saturation region, and performs passive quenching by acting as a quenching resistor. A source of the transistor 152 is connected to a power supply voltage VE, and the drain thereof is connected to the cathode of the SPAD 151, the input terminal of the inverter 154, and the one end of the switch 153. As a result, the power supply voltage VE is also supplied to the cathode of the SPAD 151. A pull-up resistor can also be used instead of the transistor 152 connected in series with the SPAD 151.

In order for the SPAD 151 to detect light (photon) with sufficient efficiency, a voltage higher than a breakdown voltage VBD of the SPAD 151 (hereinafter referred to as an excess bias) is applied to the SPAD 151. For example, in a case where the breakdown voltage VBD of the SPAD 151 is 20 V and a voltage that is 3 V higher than that is applied to the SPAD 151, the power supply voltage VE supplied to the source of the transistor 152 is 3 V.

The switch 153 is connected to the cathode of the SPAD 151, the input terminal of the inverter 154, and the drain of the transistor 152 at the one end of both ends, and is connected to a ground connection line 157 at another end thereof. The ground connection line 157 is connected to ground (GND) via a predetermined element (leakage current detection unit 201) as described later in FIG. 8. The switch 153 can include, for example, an NMOS transistor and is turned on and off according to an inverted gating signal VG_I obtained by inverting a gating control signal VG, which is the output of the latch circuit 155, by the inverter 156.

The latch circuit 155 supplies, to the inverter 156, the gating control signal VG that controls the pixel 121 to be either the active pixel or the inactive pixel on the basis of a trigger signal SET and address data DEC supplied from the pixel drive unit 111. The inverter 156 generates the inverted gating signal VG_I by inverting the gating control signal VG, and supplies it to the switch 153.

The trigger signal SET is a timing signal indicating the timing for switching the gating control signal VG, and the address data DEC is data indicating an address of the pixel set as the active pixel among the plurality of pixels 121 arranged in a matrix in the pixel array 212. The trigger signal SET and the address data DEC are supplied from the pixel drive unit 111 via the pixel drive line 122.

The latch circuit 155 reads the address data DEC at a predetermined timing indicated by the trigger signal SET. Then, in a case where a pixel address indicated by the address data DEC includes a pixel address (of the pixel 121) corresponding to the latch circuit 155 itself, the latch circuit 155 outputs the gating control signal VG set to HI (1) for setting its own pixel 121 as the active pixel. On the other hand, in a case where the pixel address indicated by the address data DEC does not include the pixel address (of the pixel 121) corresponding to the latch circuit 155 itself, the latch circuit 155 outputs the gating control signal VG set to LO (0) for setting its own pixel 121 as the inactive pixel. Therefore, in a case where the pixel 121 is set as the active pixel, the inverted gating signal VG_I set to LO (0) that is inverted by the inverter 156 is supplied to the switch 153. On the other hand, in a case where the pixel 121 is set as the inactive pixel, the inverted gating signal VG_I set to HI (1) is supplied to the switch 153. As a result, the switch 153 is turned off (disconnected) in the case where the pixel 121 is set as the active pixel, or turned on (connected) in the case where the pixel 121 is set as the inactive pixel.

The inverter 154 outputs a detection signal PFout set to HI when the cathode voltage VS as an input signal is set to LO, or outputs the detection signal PFout set to 100 when the cathode voltage VS is set to HI. The inverter 154 is an output unit that outputs the incidence of a photon on the SPAD 151 as the detection signal PFout.

Next, an operation in the case where the pixel 121 is set as the active pixel will be described with reference to FIG. 4.

Figure 4:
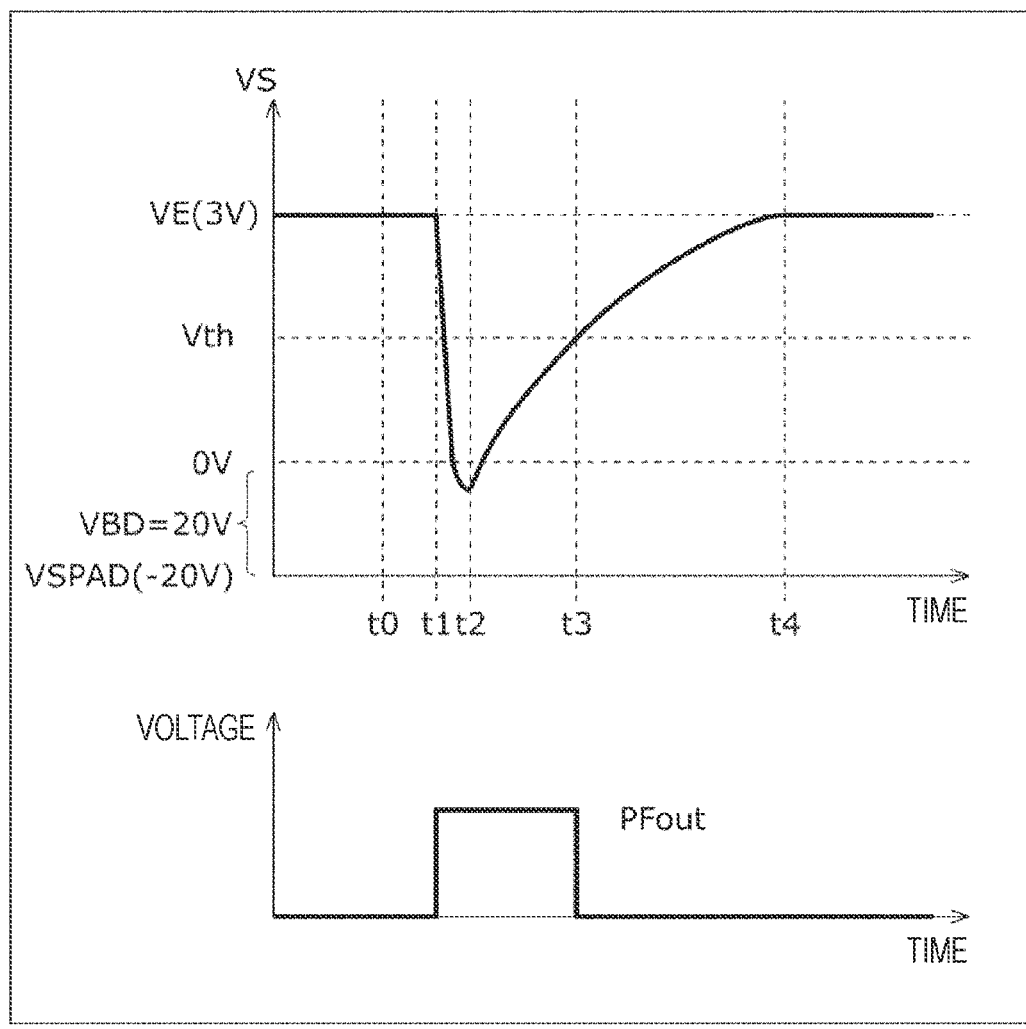
FIG. 4 is a set of graphs for explaining an operation of the pixel in FIG. 3.

Note that in the pixel 121, the power supply voltage VA supplied to the anode of the SPAD 151 fluctuates with a predetermined amplitude, but is fixed at a negative bias of −20 V in the description of FIG. 4 for the sake of simplicity. Also, the voltage of the switch 153 on the side of the ground connection line 157 is set to 0 V in the description.

FIG. 4 is a set of graphs illustrating a change in the cathode voltage VS of the SPAD 151 and the detection signal PFout in response to the incidence of a photon.

First, in a case where the pixel 121 is the active pixel, the switch 153 is set to off as described above.

Since the power supply voltage VE (for example, 3 V) is supplied to the cathode of the SPAD 151 and the power supply voltage VA (for example, −20 V) is supplied to the anode thereof, a reverse voltage higher than the breakdown voltage VBD (=20 V) is applied to the SPAD 151 so that the SPAD 151 is set to the Geiger mode. In this state, the cathode voltage VS of the SPAD 151 is equal to the power supply voltage VE as at time t0 in FIG. 4, for example.

When a photon is incident on the SPAD 151 set to the Geiger mode, an avalanche multiplication occurs so that a current flows through the SPAD 151.

Assuming that the avalanche multiplication occurs at time t1 in FIG. 4 to cause the current to flow through the SPAD 151, after time t1, the current flowing through the SPAD 151 also flows through the transistor 152 so that a voltage drop occurs due to a resistive component of the transistor 152.

When the cathode voltage VS of the SPAD 151 falls below 0 V at time t2, the anode-cathode voltage of the SPAD 151 fails below the breakdown voltage VBD, whereby the avalanche amplification stops. Here, the operation that causes the voltage drop by allowing the current generated by the avalanche amplification to flow through the transistor 152 and causes the avalanche amplification to stop by the cathode voltage VS falling below the breakdown voltage VBD due to the occurrence of the voltage drop is a quenching operation.

When the avalanche amplification stops, the current flowing through the resistor of the transistor 152 gradually decreases, and the cathode voltage VS returns to the original power supply voltage VE again at time t4 so that a next new photon can be detected (recharge operation).

The inverter 154 outputs the detection signal PFout set to LO when the cathode voltage VS as an input voltage is higher than or equal to a predetermined threshold voltage Vth, and outputs the detection signal PFout set to HI when the cathode voltage VS is lower than the predetermined threshold voltage Vth. Therefore, when a photon is incident on the SPAD 151 to cause the avalanche multiplication so that the cathode voltage VS drops and falls below the threshold voltage Vth, the detection signal PFout is inverted from the low level to the high level. On the other hand, when the avalanche multiplication of the SPAD 151 ends so that the cathode voltage VS increases to be higher than or equal to the threshold voltage Vth, the detection signal PFout is inverted from the high level to the low level.

Note that in a case where the pixel 121 is set as the inactive pixel, the inverted gating signal VG_I set to HI (1) is supplied to the switch 153, and the switch 153 is turned on. When the switch 153 is turned on, the cathode voltage VS of the SPAD 151 becomes 0 V. As a result, the anode-cathode voltage of the SPAD 151 becomes lower than or equal to the breakdown voltage VBD, so that the SPAD 151 does not respond even when a photon enters the SPAD 151.

4. Problem Due to Variation in Breakdown Voltage VBD

Now, although the breakdown voltage VBD of the SPAD 151 has been described as 20 V in the description above, the breakdown voltage VBD of the SPAD 151 varies due to individual differences. For example, the breakdown voltage VBD of the SPAD 151 in a certain one of the pixels 121 may be 19 V, 19.5 V, or 19.7 V.

A problem that may occur due to variations in the breakdown voltage VBD of the SPAD 151 will be described with reference to FIG. 5.

Figure 5:
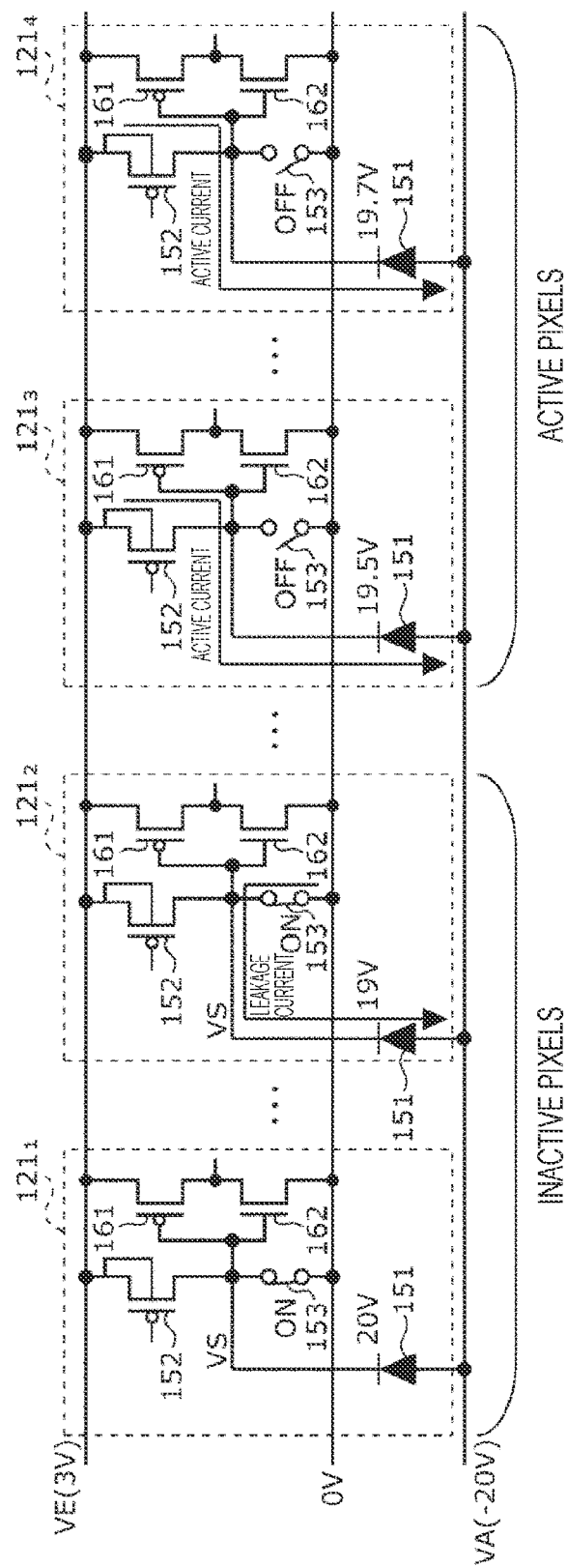
FIG. 5 is a diagram for explaining a problem due to a variation in a breakdown voltage.

Note that in the description of FIG. 5 as well, the power supply voltage VA supplied to the anode of the SPAD 151 is fixed at the negative bias of −20 V, and the voltage of the switch 153 on the side of the ground connection line 157 is also fixed at 0 V.

FIG. 5 illustrates four pixels $121_1$ to $121_4$. Furthermore, in each of the pixels $121_1$ to $121_4$ of FIG. 5, the inverter 154 includes a CMOS inverter with a PMOS transistor 161 and an NMOS transistor 162.

In FIG. 5, the breakdown voltage VBD of the SPAD 151 in the pixel $121_1$ is 20 V, the breakdown voltage VBD of the SPAD 151 in the pixel $121_2$ is 19 V, the breakdown voltage VBD of the SPAD 151 in the pixel $121_3$ is 19.5 V, and the breakdown voltage VBD of the SPAD 151 in the pixel $121_4$ is 19.7 V.

Also in FIG. 5, the pixel drive unit 111 sets the two pixels $121_1$ and $121_2$ on the left side as inactive pixels, and the two pixels $121_3$ and $121_4$ on the right side as active pixels. Therefore, the switches 153 in the two pixels $121_1$ and $121_2$ on the left side are turned on, and the switches 153 in the two pixels $121_3$ and $121_4$ on the right side are tuned off.

In each of the two pixels $121_3$ and $121_4$ on the right side set as the active pixels, the switch 153 is turned off so that the power supply voltage VE (for example, 3 V) is supplied to the cathode of the SPAD 151, and the power supply voltage VA (for example, −20 V) is supplied to the anode of the SPAD 151. The SPAD 151 is thus set to the Geiger mode, and when a photon is incident on the SPAD 151, an avalanche multiplication occurs to cause a current to flow through the SPAD 151. In each of the pixels $121_3$ and $121_4$ being the active pixels, the current flowing through the SPAD 151 in response to the incidence of the photon is an active current intended by the active pixel.

On the other hand, in each of the two pixels $121_1$ and $121_2$ on the left side set as the inactive pixels, the switch 153 is turned off so that the cathode voltage VS of The SPAD 151 is controlled to 0 V. As a result, the anode cathode voltage of the SPAD 151 in each of the pixel $121_1$ and the pixel $121_2$ equals 20 V.

Since the breakdown voltage VBD of the SHAD 151 in the pixel $121_1$ is 20 V, the anode-cathode voltage is lower than or equal to the breakdown voltage VBD so that the SHAD 151 in the pixel $121_1$ does not respond even when a photon enters. On the other hand, since the breakdown voltage VBD of the SHAD 151 in the pixel $121_2$ is 19 V, the anode-cathode voltage is still higher than the breakdown voltage VBD of the SHAD 151. Therefore, when a photon is incident on the SHAD 151 in the pixel $121_2$, an avalanche multiplication occurs to cause a current to flow through the SHAD 151. In the pixel 121₂ being the active pixel, the current flowing through the SHAD 151 in response to the incidence of the photon is a leakage current unintended by the inactive pixel.

In order to prevent the leakage current in the pixel 121₂ of FIG. 5, the power supply voltage VA can be set in accordance with the SHAD 151 in the pixel 121₂ having the lowest breakdown voltage VBD. However, in order to identify the SHAD 151 having the lowest breakdown voltage VBD, the breakdown voltages VBD of the SPADs 151 in all the pixels need to be measured, which requires a lot of man-hours. Furthermore, the breakdown voltage VBD of the SHAD 151 can change not only due to individual differences but also due to temperature changes. For example, with a temperature change of 100° C., the breakdown voltage VBD changes on the order of several volts.

Figure 6:
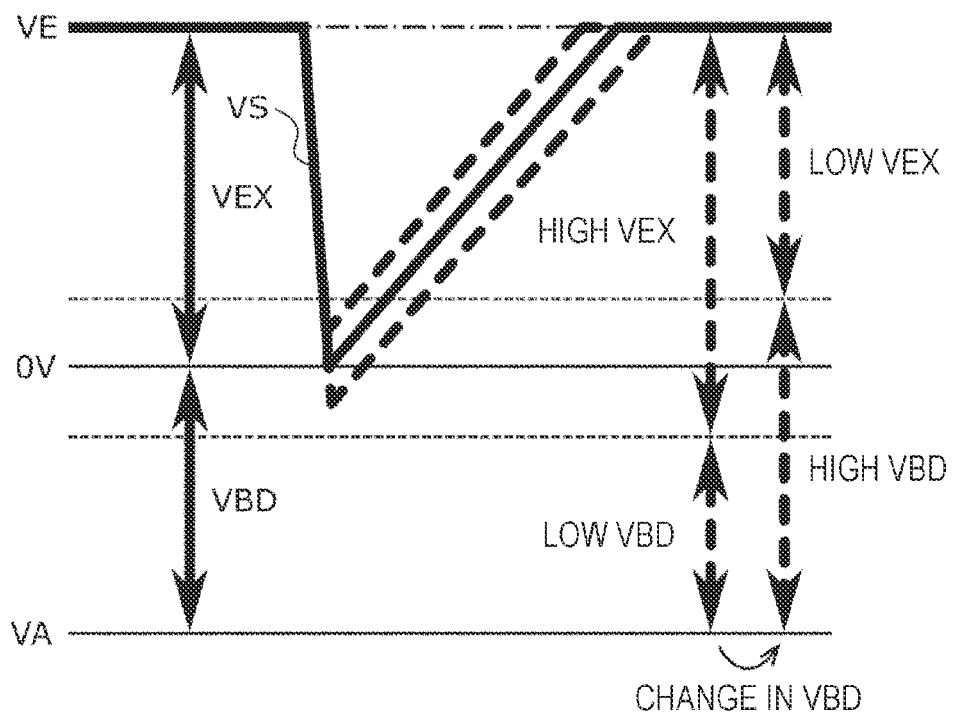
FIG. 6 is a diagram for explaining the problem due to the variation in the breakdown voltage.

For example, even when the SPAD 151 having the lowest breakdown voltage VBD is identified and the power supply voltage VA is see, in a case where a temperature change causes an increase in the breakdown voltage VBD, the excess bias VEX is relatively decreased as is clear from FIG. 6.

FIG. 6 is a conceptual diagram illustrating a change in the excess bias VEX according to a change in the breakdown voltage VBD of the active pixel in a case where the power supply voltage VA is set fixed.

When the change in the breakdown voltage VBD due to the temperature change causes the excess bias VEX to be too low, the SPAD 151 does not respond even when a photon enters the SPAD 151. The higher the excess bias VEX, the better a pixel characteristic. Here, the pixel characteristic refers to, for example, photon detection efficiency (PDE) representing a probability that one incident photon is detected.

Therefore, in order to improve the pixel characteristic, it is necessary to control the power supply voltage VA in accordance with the SPAD 151 having the lowest breakdown voltage VBD and to respond to the change in the breakdown voltage VBD due to the temperature change.

However, in addition to the time and effort of measuring the breakdown voltages VBD of the SPADE 151 in all the pixels, storing a fluctuation characteristic of the breakdown voltage VBD corresponding to the temperature and performing control with high accuracy while monitoring the temperature require a large-scale control circuit and thus are not realistic.

Therefore, the pixel 121 of the light receiving element 52 adopts the configuration that controls the power supply voltage VA in accordance with the SHAD 151 having the lowest breakdown voltage VBD according to the change in the breakdown voltage VBD due to the temperature change, without directly detecting the temperature change.

5. Example of Setting Active Pixels and Inactive Pixels

Figure 7:
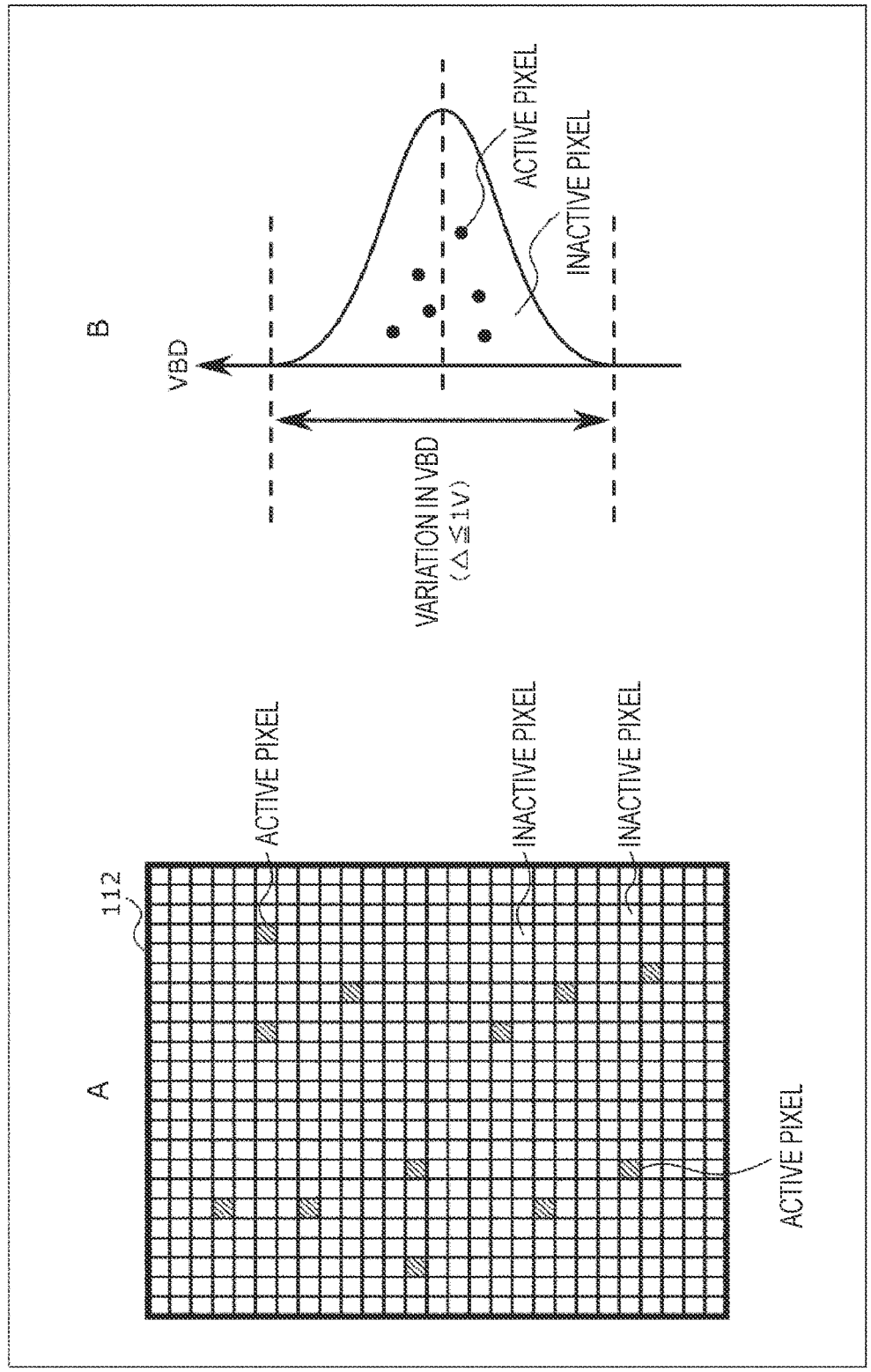
FIG. 7 is a set of diagrams illustrating an example of setting active pixels and inactive pixels.

FIG. 7 illustrates an example of setting the plurality of pixels 121 in the pixel array 112 as the active pixels and inactive pixels.

As described above, the pixel drive unit 111 of the light receiving element 52 performs control to set a part of the plurality of pixels 121 two-dimensionally arranged in a matrix as the active pixels and the remaining part thereof as the inactive pixels. Here, the number of pixels set as the active pixels by the pixel drive unit 111 is smaller than the number of pixels in the entire pixel array 112. For example, a ratio of the active pixels in the pixel array 112 is set to 1% to several %. In A of FIG. 7, the pixels 121 that are hatched represent the active pixels, and the pixels 121 that are not hatched represent the inactive pixels.

When the active pixels are thus set at a small ratio with respect to all the pixels in the pixel array 112, as illustrated in B of FIG. 7, most of the pixels 121 in the pixel array 112 are the inactive pixels so that it can be assumed that the pixel 121 including the SPAD 151 with the lowest breakdown voltage VBD is present among the inactive pixels in the pixel array 112. In other words, it can be assumed that the pixel 121 including the SPAD 151 with the lowest breakdown voltage VBD is the inactive pixel.

6. First Configuration Example of Voltage Control Circuit

Figure 8:
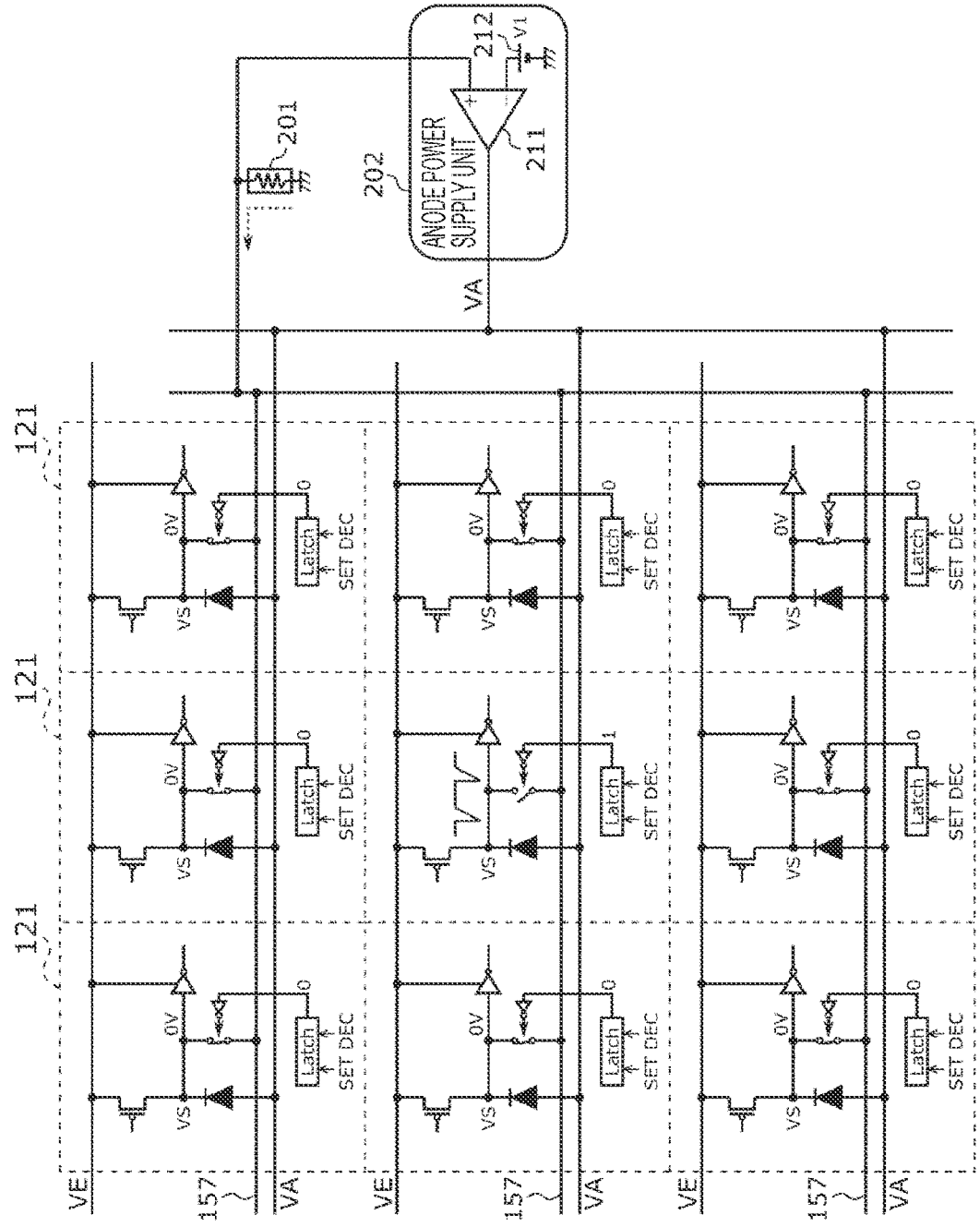
FIG. 8 is a diagram illustrating a first configuration example of a voltage control circuit.

FIG. 8 illustrates a first configuration example of a voltage control circuit that controls the anode voltage VA of each pixel 121 in the pixel array 112.

FIG. 8 illustrates 3×3 (three rows and three columns) or nine of the pixels 121 as some of the pixels 121 in the pixel array 112, and a leakage current detection unit 201 and an anode power supply unit 202 as the voltage control circuit that controls the anode voltage VA of each pixel 121.

Among the 3×3 or nine pixels 121 in FIG. 8, the pixel 121 arranged the center has the output of the latch circuit 155 set to HI (1) and is set as the active pixel. Each of the other eight pixels 121 has the output of the latch circuit 155 set to LO (0) and is set as the inactive pixel. Note that in FIG. 8, the reference numerals in the pixels are omitted to avoid the figure from being complicated.

The ground connection line 157 wired in the horizontal direction of the pixel array 112 is connected to the ground (GND) via the leakage current detection unit 201. The leakage current detection unit 201 includes a resistor, for example.

The anode power supply unit 202 supplies the power supply voltage VA to the anode of the SPAD 151 in each pixel 121 of the pixel array 112. The anode power supply unit 202 includes an operational amplifier 211 with a "+" input terminal (first input terminal) of the operational amplifier 211 receiving the output of the leakage current detection unit 201, and a "−" input terminal (second input terminal) receiving a predetermined power supply voltage V1 from a power supply 212. The operational amplifier 211 is a voltage control unit that controls and outputs the power supply voltage VA such that an input voltage to the "+" input terminal and an input voltage to the "−" input terminal are equal to each other. The power supply voltage V1 supplied from the power supply 212 is determined by a set value of the leakage current flowing through the ground connection line 157. The power supply voltage V1 is set to −10 mV, for example.

The operation of the leakage current detection unit 201 and the anode power supply unit 202 that control the anode voltage VA will be described.

First, the switch 153 of the pixel 121 set as the inactive pixel in the pixel array 112 is turned off. In a state in which no light is incident on the inactive pixel, the cathode voltage VS of the SPAD 151 in the inactive pixel is controlled to 0 V.

In this state, the operational amplifier 211 receives 0 V as the input voltage to the "+" input terminal and −10 mV as the input voltage to the "−" input terminal, whereby the operational amplifier 211 performs control to decrease the power supply voltage VA supplied to the anode of the SPAD 151.

When the operational amplifier 211 performs control to decrease the anode voltage VA of the SPAD 151 in the inactive pixel, the anode-cathode voltage of the SPAD 151 increases. As a result, among the plurality of inactive pixels in the pixel array 112, the inactive pixel with the SPAD 151 having the lowest breakdown voltage VBD has the anode-cathode voltage higher than the breakdown voltage VBD so that, when a photon is incident on the SPAD 151, the leakage current flows through the SPAD 151 as in the pixel 121$_2$ of FIG. 5.

When the leakage current flows through the inactive pixel with the SPAD 151 having the lowest breakdown voltage VBD, a voltage drop (IR drop) occurs due to the resistor as the leakage current detection unit 201 connected via the ground connection line 157, whereby the input voltage to the "+" input terminal of the operational amplifier 211 drops from 0 V.

Then, when the input voltage to the "+" input terminal of the operational amplifier 211 falls below −10 mV as the input voltage to the "−" input terminal, the operational amplifier 211 this time performs control to increase the power supply voltage VA supplied to the anode of the SPAD 151. When the power supply voltage VA supplied to the anode of the SPAD 151 is increased, the anode-cathode voltage in the inactive pixel with the SPAD 151 having the lowest breakdown voltage VBD becomes lower than or equal to the breakdown voltage VBD, whereby the leakage current no longer flows.

As described above, the leakage current detection unit 201 detects the leakage current flowing in the inactive pixel with the SPAD 151 having The lowest breakdown voltage VBD among the plurality of inactive pixels in the pixel array 112. The anode power supply unit 202 controls the anode voltage VA such that the leakage current equals a certain current (current value within a predetermined range). The resistance value of the resistor as the leakage current detection unit 201 is set according to the detection level of the leakage current. For example, in a case where the power supply voltage V1 is −10 mV and the control is to be performed with the leakage current of 1 mA, the resistance value of the leakage current detection unit 201 is set to 10Ω.

As described above, the leakage current starts to flow from the SPAD 151 in the inactive pixel having the lowest breakdown voltage VPD in the pixel array 112, and the voltage control circuit detects the leakage current and controls the anode voltage VA. For the voltage control circuit, it is irrelevant (unnecessary to know) which of the plurality of inactive pixels includes the SPAD 151 having the lowest breakdown voltage VBD, and there is no problem if the pixel having the lowest breakdown voltage VBD changes due to a temperature change or the like during use. There is also no need to detect or select an inactive pixel having the lowest breakdown voltage VBD.

Figure 9:
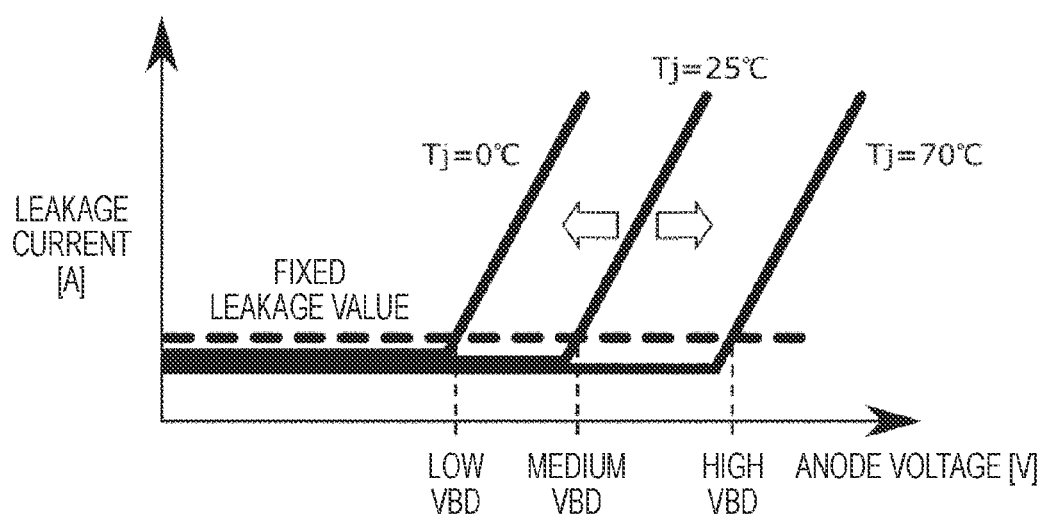
FIG. 9 is a graph illustrating changes in the breakdown voltage due to differences in temperature.

FIG. 9 is a graph illustrating changes in the breakdown voltage VBD due to differences in temperature.

In the graph of FIG. 9, the horizontal axis represents the anode voltage, and the vertical axis represents the leakage current when the SPAD 151 responds.

As can be seen from FIG. 9, the breakdown voltage VBD changes according to the temperature change and increases when the temperature is high, but the voltage control circuit controls the anode voltage VA such that the leakage current is at a certain value (lower than or equal to a fixed leakage value in FIG. 9) at all times.

Figure 10:
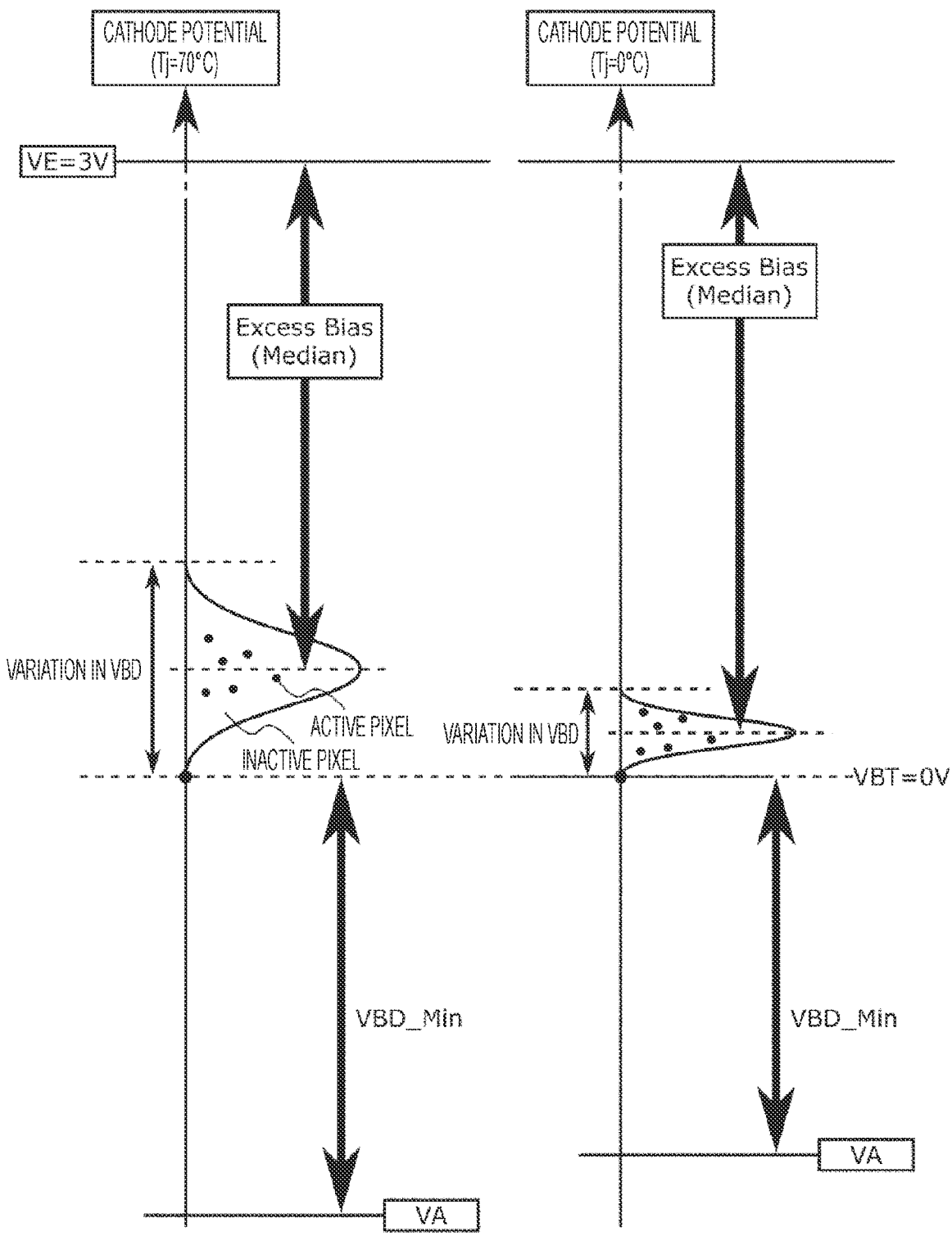
FIG. 10 is a conceptual diagram illustrating an operation of the voltage control circuit according to a change in the breakdown voltage due to a temperature change.

FIG. 10 is a conceptual diagram illustrating an operation of the voltage control circuit according to a change in the breakdown voltage VBD due to a temperature change.

The voltage control circuit causes the anode voltage VA to change according to the pixel 121 having a lowest breakdown voltage VBD_Min among the inactive pixels. The voltage control circuit performs control such that the cathode voltage VS of the pixel 121 having the lowest breakdown voltage VBD_Min equals 0 V (VBT=0 V) even when the magnitude of the lowest breakdown voltage VBD_Min changes due to a temperature change or the like.

Figure 11:
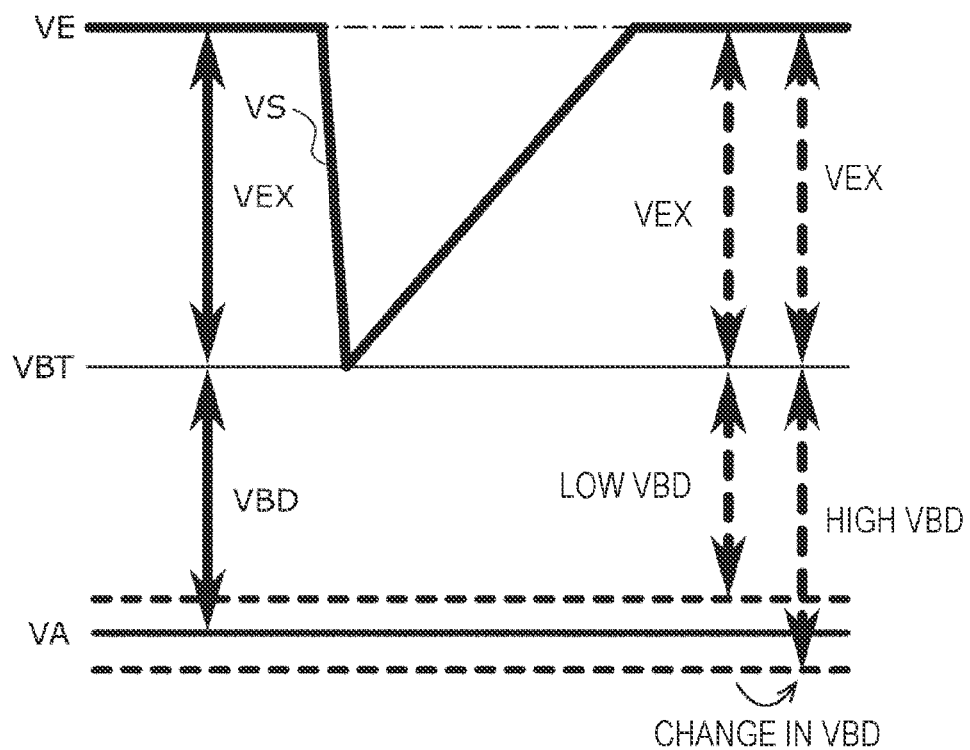
FIG. 11 is a conceptual diagram illustrating a change in an excess bias caused by the voltage control circuit of the light receiving element.

FIG. 11 is a conceptual diagram illustrating a change in the excess bias VEX caused by the voltage control circuit of the light receiving element 52, the diagram being illustrated in correspondence with FIG. 6.

The voltage control circuit of the light receiving element 52 controls the anode power supply voltage VA such that the leakage current is always at a certain value and that, as illustrated in FIG. 11, the excess bias VEX is at a certain value in accordance with the SPAD 151 having the lowest breakdown voltage VBD_Min even when the breakdown voltage VBD changes with the temperature change.

A state in which the anode voltage VA of the SPAD 151 is lowered to the greatest extent without causing the leakage current of a certain value or higher to flow in the pixel 121 with the lowest breakdown voltage VBD_Min among the plurality of inactive pixels in the pixel array 112 is a state in which the excess bias VEX for all the SPADs 151 the pixel array 112 is maximized. Therefore, according to the voltage control circuit, the excess bias VEX for all the SPADs 151 in the pixel array 112 can be maximized.

As described above, according to the first configuration example of the voltage control circuit, the pixel characteristic can be improved by maximizing the excess bias VEX in response to the change in the breakdown voltage VBD of the SPAD 151 due to the temperature change of the pixel array 112.

7. Second Configuration Example of Voltage Control Circuit

Figure 12:
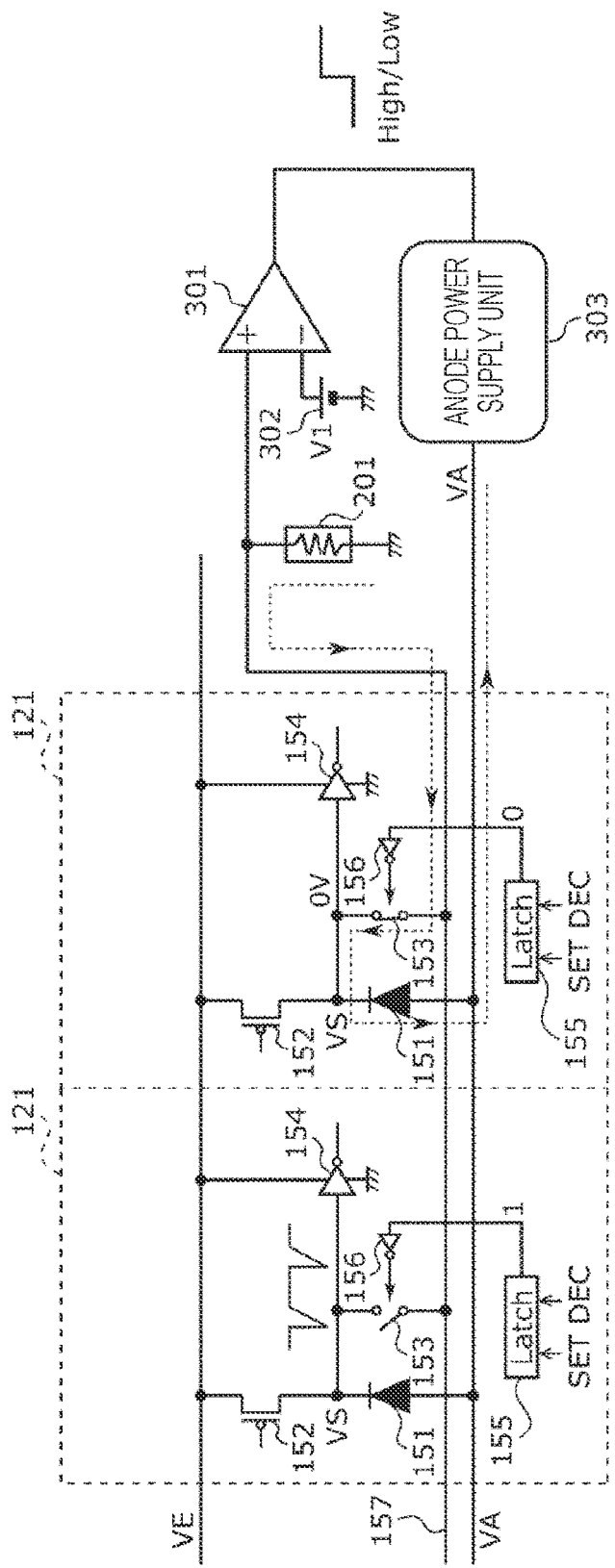
FIG. 12 is a diagram illustrating a second configuration example of a voltage control circuit.

FIG. 12 illustrates a second configuration example of a voltage control circuit that controls the anode voltage VA of each pixel 121 in the pixel array 112.

FIG. 12 illustrates one of each of the active pixel and the inactive pixel, and the voltage control circuit according to the second configuration example.

The voltage control circuit according to the second configuration example includes the leakage current detection unit 201, a comparator 301, and an anode power supply unit 303.

The ground connection line 157 wired in the horizontal direction of the pixel array 112 is connected to the leakage current detection unit 201 and a "+" input terminal (first input terminal) of the comparator 301. A "−" input terminal (second input terminal) of the comparator 301 receives a predetermined power supply voltage V1 from a power supply 302. The comparator 301 compares the input voltage to the "+" input terminal with the input voltage to the "−" input terminal, and outputs a comparison result signal set to HI (1) to the anode power supply unit 303 in a case where the input voltage to the "+" input terminal is higher than the input voltage to the "−" input terminal in other words, when a leakage current larger than a predetermined value flows, the comparator 301 detects the leakage current and outputs the comparison result signal set to HI. In a case where the leakage current is less than or equal to the predetermined value, the comparator 301 outputs the comparison result signal set to LO to the anode power supply unit 303. The comparator 301 is a voltage control unit that controls the power supply voltage VA output from the anode power supply unit 303.

The anode power supply unit 303 performs control to hold the power supply voltage VA supplied to the anode of the SPAD 151 when the comparison result signal supplied from the comparator 301 is set to HI, or performs control to lower the power supply voltage VA when the comparison result signal is set to LO. In other words, the anode power supply unit 303 performs control to hold the power supply voltage VA supplied to the anode of the SPAD 151 in a case where the leakage current larger than the predetermined value flows, or performs control to lower the power supply voltage VA in a case where the leakage current is less than or equal to the predetermined value. As a result, the power supply voltage VA is controlled to the state in which the anode voltage VA of the SPAR 151 is lowered to the greatest extent without causing the leakage current of a certain value or higher to flow in the pixel 121 with the lowest breakdown voltage VBD_Min among the plurality of inactive pixels in the pixel array 112. Therefore, according to the voltage control circuit, the excess bias VEX can be maximized.

As described above, in the second configuration example of the voltage control circuit as well, the pixel characteristic can be improved by maximizing the excess bias VEX in response to the change in the breakdown voltage VPD of the SPAD 151 due to the temperature change of the pixel array 112.

8. Third Configuration Example of Voltage Control Circuit

Figure 13:
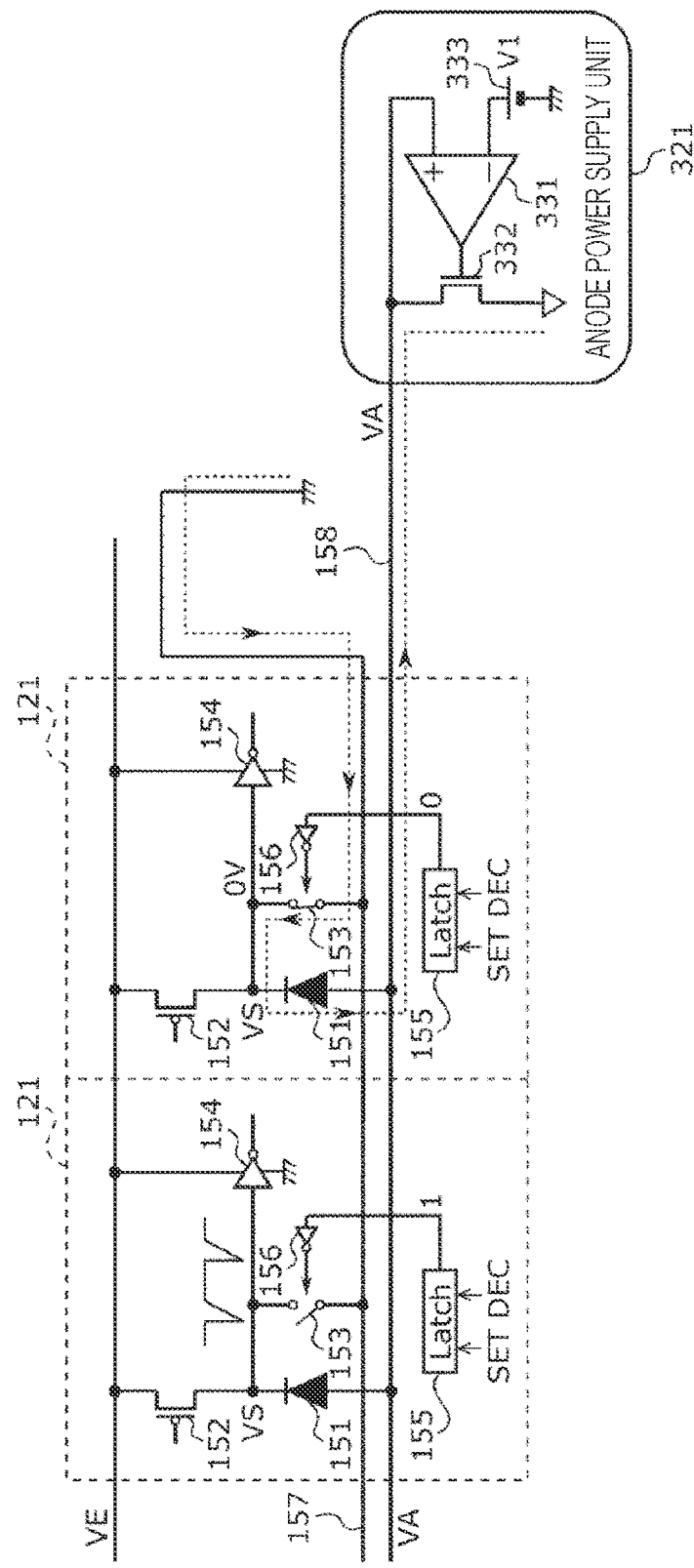
FIG. 13 is a diagram illustrating a third configuration example of a voltage control circuit.

FIG. 13 illustrates a third configuration example of a voltage control circuit that controls the anode voltage VA of each pixel 121 in the pixel array 112.

FIG. 13 illustrates one of each of The active pixel and the inactive pixel, and the voltage control circuit according to the third configuration example.

In the first configuration example and the second configuration example of the voltage control circuit described above, the leakage current flowing through the SPAD 151 is detected on the cathode side, whereas the third configuration example of FIG. 13 has a configuration in which the leakage current is detected on the anode side.

The voltage control circuit according to the third configuration example includes an anode power supply unit 321 including an operational amplifier 331 and a transistor 332. Specifically, a power supply line 158 that supplies the power supply voltage VA to the anode of the SPAD 151 in each pixel 121 is input to a "+" input terminal of the operational amplifier 331, and a predetermined power supply voltage V1 from a power supply 333 is input to a "−" input terminal of the operational amplifier 331. The operational amplifier 331 and the transistor 332 form a constant current circuit, and control the current flowing through the power supply line 158 to be constant. The transistor 332 corresponds to the leakage current detection unit 201 in the first configuration example and the second configuration example. The ground connection line 157 wired in the horizontal direction of the pixel array 112 is directly connected to the ground (GND) so that the switch 153, when turned on, directly connects the anode of the SPAD 151 to the ground.

The third configuration example has the configuration in which the leakage current flowing through the SPAD 151 is detected on the anode side, and thus an active current from the active pixel can also flow through the power supply line 158. Therefore, the power supply voltage VA needs to be controlled with the current value controlled by the anode power supply unit 321 being set as a value including the active current and the leakage current, or needs to be controlled by stopping the selection of the active pixel, setting all the pixels 121 as the inactive pixels, and performing the operation in a leakage current detection mode that detects the leakage current of the inactive pixel.

As described above, the excess bias VEX can be maximized by controlling the power supply voltage VA such that the current flowing through the power supply line 158 is constant. Therefore, in the third configuration example of the voltage control circuit as well, the pixel characteristic can be improved by maximizing the excess bias VEX in response to the change in the breakdown voltage VBD of the SPAD 151 due to the temperature change of the pixel array 112.

9. Fourth Configuration Example of Voltage Control Circuit

Figure 14:
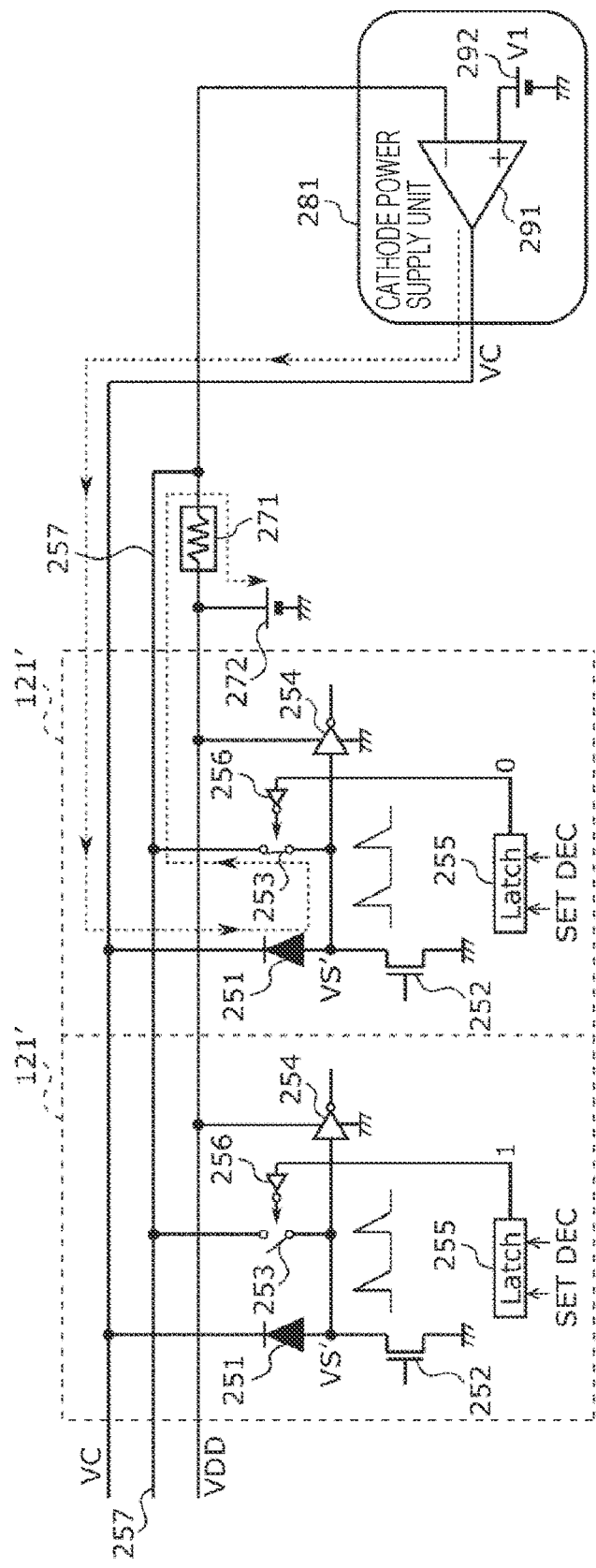
FIG. 14 is a diagram illustrating a fourth configuration example of a voltage control circuit.

FIG. 14 illustrates a fourth configuration example of a voltage control circuit.

In FIG. 14, the pixel 121 is changed to a pixel 121'. The pixel 121 described above is configured to apply the negative bias to the anode of the SPAD and set the SPAD to the Geiger mode, whereas the configuration of the pixel 121' in FIG. 14 is changed to one that sets the SPAD to the Geiger mode in a positive voltage range.

The voltage control circuit according to the fourth configuration example has a circuit configuration in which the voltage control circuit according to the first configuration example illustrated in FIG. 8 is changed in response to the change from the pixel 121 to the pixel 121', and has a configuration that controls a power supply voltage VC supplied to the cathode of the SPAD. Specifically, the voltage control circuit according to the fourth configuration example includes a leakage current detection unit 271 and a cathode power supply unit 281. The leakage current detection unit 271 includes a resistor, for example, and the cathode power supply unit 281 includes an operational amplifier 291.

The pixel 121' includes an SPAD 251, a transistor 252, a switch 253, an inverter 254, a latch circuit 255, and an inverter 256. The transistor 252 includes an NMOS transistor.

An anode of the SPAD 251 is connected to a drain of the transistor 252, and is also connected to an input terminal of the inverter 254 and one end of the switch 253. A cathode of the SPAD 251 is connected to the power supply voltage VC.

The SPAD 251 is a photodiode (single photon avalanche photodiode) that causes avalanche amplification of electrons generated at the time of incidence of incident light, and outputs a signal of the cathode voltage VS. The power supply voltage VC supplied to the cathode of the SPAD 251 is, for example, a positive bias (positive potential) of about 23 V. The breakdown voltage VBD of the SPAD 251 is assumed to be, for example, 20 V as in the above example.

The transistor 252 is a constant current source that operates in a saturation region, and performs passive quenching by acting as a quenching resistor. A source of the transistor 252 is connected to the ground (GND), and the drain thereof is connected to the anode of the SPAD 251, the input terminal of the inverter 254, and the one end of the switch 253. A pull-down resistor can also be used instead of the transistor 252 connected in series with the SPAD 251.

The switch 253 is connected to the anode of the SPAD 251, the input terminal of the inverter 254, and the drain of the transistor 252 at the one end of both ends, and is connected to the leakage current detection unit 271 and a "−" input terminal of the operational ampler 291 via wiring 257 at another end thereof. The leakage current detection unit 271 is arranged between the wiring 257 and a power supply voltage 272 that supplies a power supply voltage VDD.

The switch 253 can include, for example, an NMOS transistor and is turned on and off according to an inverted gating signal VG_I that is the output of the inverter 256.

The latch circuit 255 supplies, to the inverter 256, the gating control signal VG that controls the pixel 121' to be either the active pixel or the inactive pixel on the basis of the trigger signal SET and the address data DEC supplied from the pixel drive unit 111. The inverter 256 generates the inverted gating signal VG_I by inverting the gating control signal VG, and supplies it to the switch 253. Since the control of the latch circuit 255 is similar to that of the latch circuit 155 described with reference to FIG. 3, the description thereof will be omitted.

The inverter 254 outputs a detection signal PFout set to HI when an anode voltage VS' as an input signal is set to LO, or outputs the detection signal PFout set to LO when the anode voltage VS' is set to HI. The inverter 254 is an output unit that outputs the incidence of a photon on the SPAD 251 as the detection signal PFout.

The operation in a case where the pixel 121' is set as the active pixel is basically similar to the operation of the pixel 121, whereby detailed description thereof will be omitted. Note, however, that the occurrence of avalanche multiplication causes the cathode voltage VS to drop from the power supply voltage VP in the pixel 121, whereas in the pixel 121', the anode voltage VS' increases from 0 V.

The operational amplifier 291 of the cathode power supply unit 281 supplies the power supply voltage VC to the cathode of the SPAD 251 in each pixel 121' of the pixel array 112. A predetermined power supply voltage V1 is input from a power supply 292 to a "+" input terminal of the operational amplifier 291, and a voltage corresponding to the leakage current flowing through the wiring 257 is input to the "−" input terminal of the operational amplifier 291. The operational amplifier 291 is a voltage control unit that controls and outputs the power supply voltage VC such that the input voltage to the "+" input terminal and the input voltage to the "−" input terminal are equal to each other. The power supply voltage V1 supplied from the power supply 292 is determined by a set value of the leakage current flowing through the wiring 257.

When the leakage current flows in the inactive pixel with the SPAD 251 having the lowest breakdown voltage VBD, the input voltage to the "−" input terminal of the operational amplifier 291 increases. When the input voltage to the "−" input terminal of the operational amplifier 291 exceeds the input voltage to the "+" input terminal, the operational amplifier 291 this time performs control to lower the power supply voltage VC supplied to the cathode of the SPAD 251. When the power supply voltage VC supplied to the cathode of the SPAD 251 is lowered, the anode-cathode voltage in the inactive pixel with the SPAD 251 having the lowest breakdown voltage VBD becomes lower than or equal to the breakdown voltage VBD, whereby the leakage current no longer flows. As a result, the power supply voltage VC is controlled to a state in which the power supply voltage VC for the cathode of the SPAD 251 is increased to the greatest extent without causing the leakage current of a certain value or higher to flow in the pixel 121' with the lowest breakdown voltage VBD_Min among the plurality of inactive pixels in the pixel array 112. Therefore, the voltage control circuit according to the fourth configuration example can maximize the excess bias As described above, in the fourth configuration example of the voltage control circuit as well, the pixel characteristic can be improved by maximizing the excess bias VEX in response to the change in the breakdown voltage VBD of the SPAD 251 due to the temperature change of the pixel array 112.

Note that the fourth configuration example of the voltage control circuit has the configuration obtained by changing the first configuration example of the voltage control circuit such that the power supply voltage VC for the cathode side of the SPAD 251 is controlled in response to the change of the pixel configuration from the pixel 121 to the pixel 121'. Similarly, the second configuration example and the third configuration example can have the configuration that controls the power supply voltage VC for the cathode side of the SPAD 251 with the change from the pixel 121 to the pixel 121'.

10. Example of use of Ranging System

Figure 15:
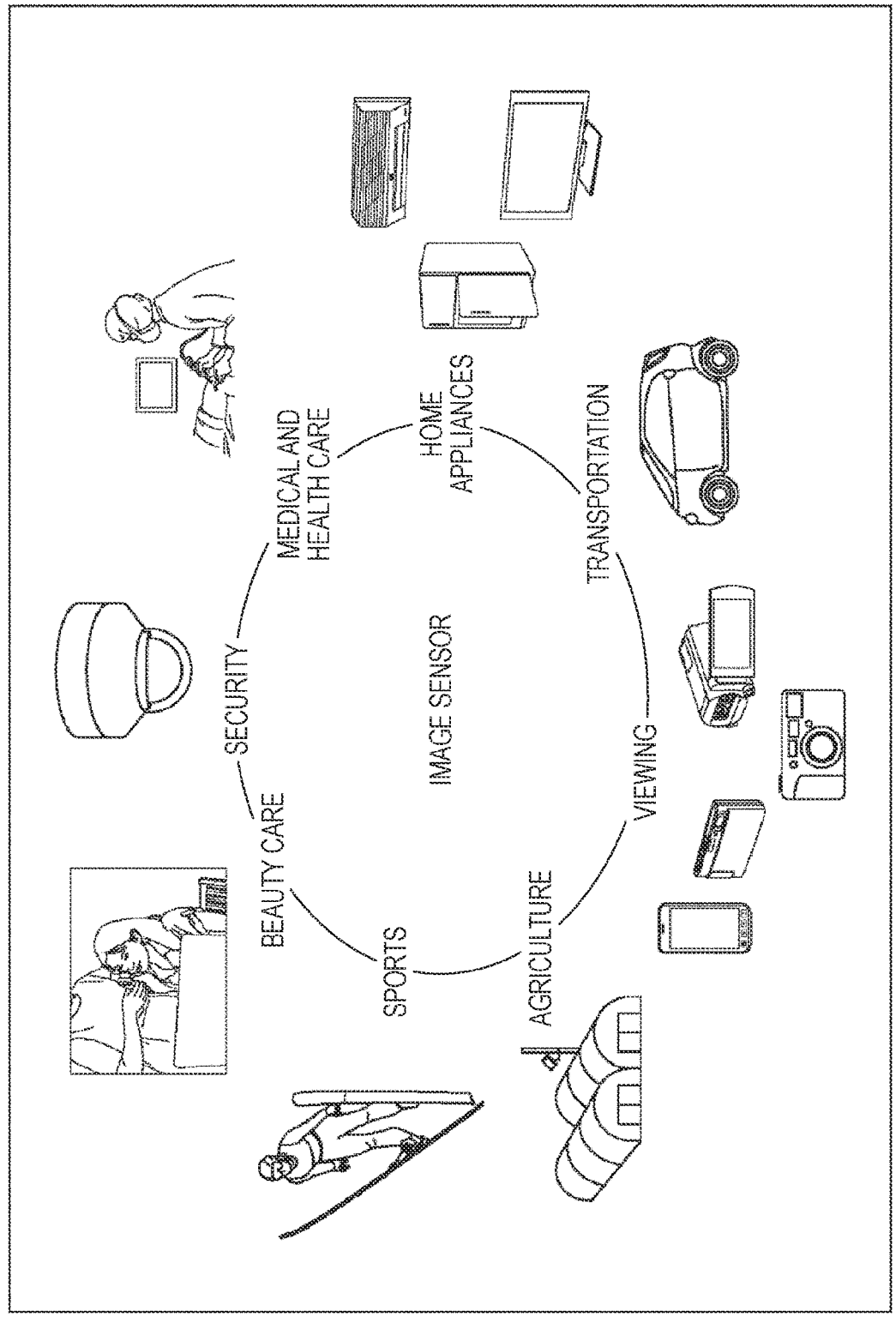
FIG. 15 is a diagram for explaining an example of use of a ranging system.

FIG. 15 is a diagram illustrating an example of use of the ranging system 11 described above.

The ranging system 11 described above can be used in various cases of sensing light such as visible infrared light, ultraviolet light, or X rays as described below, for example.

- A device such as a digital camera or a portable device with a camera function for capturing an image to be used for viewing
- A device for use in transportation such as an in-vehicle sensor that images the front, back, periphery, interior, and the like of a vehicle for safe driving such as automatic stop, recognizing the condition of a driver, or the like, a surveillance camera that monitors traveling vehicles and roads, or a range sensor that measures the distance between vehicles and the like
- A device for use in a home appliance such as a TV, a refrigerator, or an air conditioner to image a gesture of a user and operate the appliance in accordance with the gesture
- A device for use in medical and health care such as an endoscope or a device that performs angiography by receiving infrared light
- A device for use in security such as a surveillance camera intended for crime prevention or a camera intended for person authentication
- A device for use in beauty care such as a skin measuring instrument that images skin or a microscope that images the scalp
- A device for use in sports such as an action camera or a wearable camera intended for sports or the like
- A device for use in agriculture such as a camera that monitors the condition of fields and crops

11. Example of Application to Mobile Body

The technology according to the present disclosure (the present technology) can be applied to various products. For example, the technology according to the present disclosure may be implemented as a device mounted on a mobile body of any type such as a vehicle, an electric vehicle, a hybrid electric vehicle, a motorcycle, a bicycle, a personal mobility, an airplane, a drone, a ship, or a robot.

Figure 16:
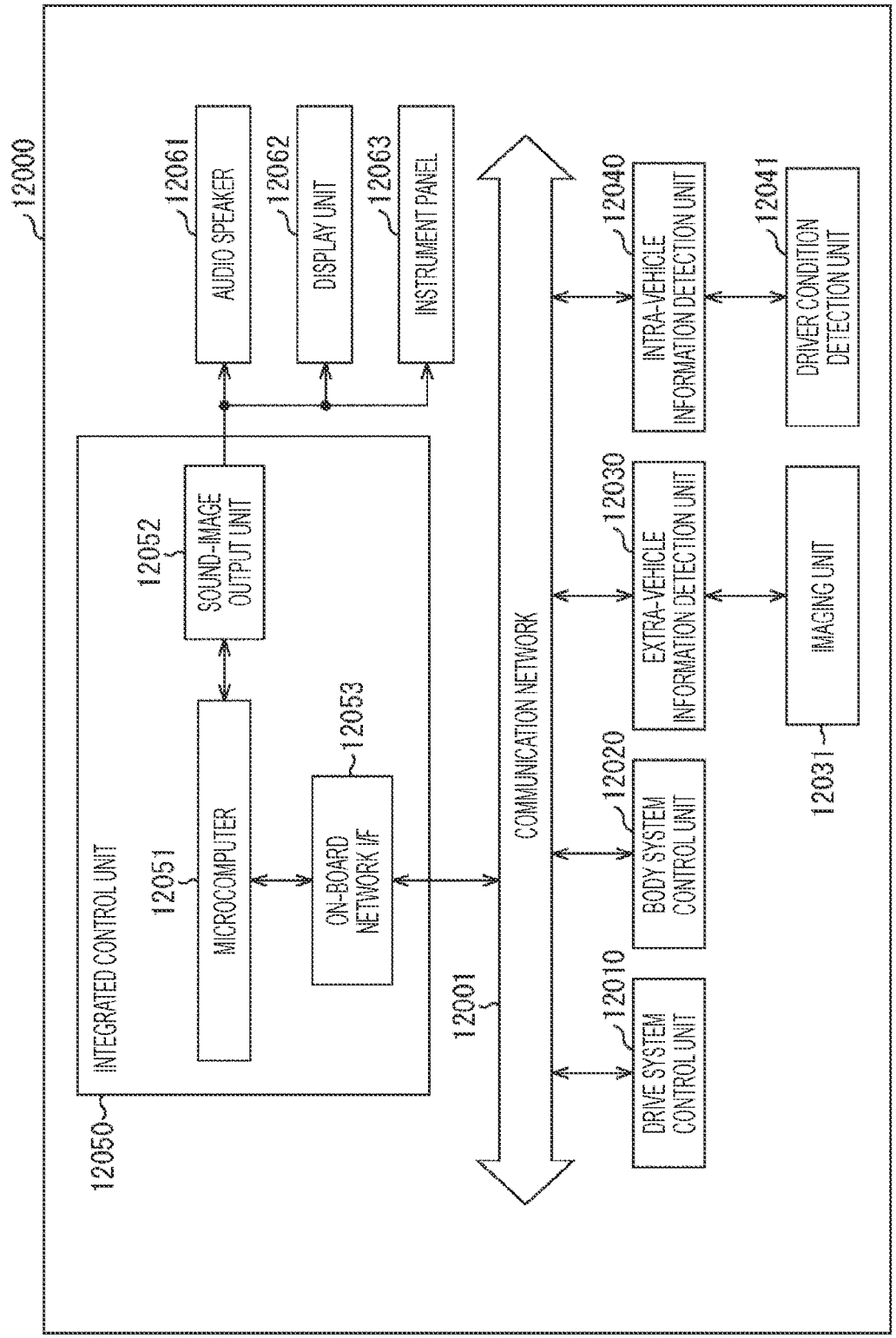
FIG. 16 is a block diagram illustrating an example of a schematic configuration of a vehicle control system.

FIG. 16 is a block diagram illustrating an example of a schematic configuration of a vehicle control system that is an example of a mobile body control system to which the technology according to the present disclosure can be applied.

A vehicle control system 12000 includes a plurality of electronic control units connected via a communication network 12001. In the example illustrated in FIG. 16, the vehicle control system 12000 includes a drive system control unit 12010, a body system control unit 12020, an extra-vehicle information detection unit 12030, an intra-vehicle information detection unit 12040, and an integrated control unit 12050. Moreover, as a functional configuration of the integrated control unit 12050, a microcomputer 12051, a sound-image output unit 12052, and an on-board network interface (I/F) 12053 are illustrated.

The drive system control unit 12010 controls the operation of a device associated with a drive system of a vehicle according to various programs. For example, the drive system control unit 12010 functions as a controller of a driving force generator such as an internal combustion engine or a driving motor for generating the driving force of the vehicle, a driving force transmitting mechanism for transmitting the driving force to the wheels, a steering mechanism for adjusting the steering angle of the vehicle, a braking device for generating the braking force of the vehicle, or the like.

The body system control unit 12020 controls the operation of various devices installed to the vehicle body accord in to various programs. For example, the body system control unit 12020 functions as a controller of a keyless entry system, a smart key system, a power window device, or various lamps such as a head lamp, a back lamp, a brake lamp, a turn signal, or a fog lamp. In this case, the body system control unit 12020 can receive input of radio waves transmitted from a portable device substituted for a key or signals of various switches. The body system control unit 12020 receives the input of these radio waves or signals to control the door lock device, power window device, lamps, or the like of the vehicle.

The extra-vehicle information detection unit 12030 detects information on the outside of the vehicle on which the vehicle control system 12000 is mounted. The extra-vehicle information detection unit 12030 is connected to an imaging unit 12031, for example. The extra-vehicle information detection unit 12030 causes the imaging unit 12031 to capture an image of the outside of the vehicle and receives the image captured. The extra-vehicle information detection unit 12030 may perform object detection processing or distance detection processing for a person, a vehicle, an obstacle, a sign, a character on a road surface, or the like on the basis of the image received.

The imaging unit 12031 is an optical sensor that receives light and outputs an electrical signal corresponding to the amount of light received. The imaging unit 12031 can output the electrical signal as an image or as ranging information. Moreover, the light received by the imaging unit 12031 may be visible light or invisible light such as infrared light.

The intra-vehicle information detection unit 12040 detects information on the inside of the vehicle. The intra-vehicle information detection unit 12040 is connected to a driver condition detection unit 12041 for detecting the condition of a driver, for example. The driver condition detection unit 12041 includes a camera that images the driver, for example, and the intra-vehicle information detection unit 12040 may calculate a degree of fatigue or degree of concentration of the driver or may determine whether the driver is dozing off on the basis of detection information input from the driver condition detection unit 12041.

The microcomputer 12051 calculates a control target value of the driving force generator, the steering mechanism, or the braking device on the basis of the information on the inside or outside of the vehicle acquired by the extra-vehicle information detection unit 12030 or the intra-vehicle information detection unit 12040, thereby being able to output a control command to the drive system control unit 12010. For example, the microcomputer 12051 can perform cooperative control for the purpose of implementing the function of an advanced driver assistance system (ADAS) including collision avoidance or impact mitigation for the vehicle, travel following a vehicle ahead, constant speed travel, or a vehicle collision warning based on the distance between vehicles, a warning for the vehicle going off the lane, or the like.

Moreover, the microcomputer 12051 controls the driving force generator, the steering mechanism, the braking device, or the like on the basis of information on the surroundings of the vehicle acquired by the extra-vehicle information detection unit 12030 or the intra-vehicle information detection unit 12040, thereby being able to perform cooperative control for the purpose of automated driving or the like that enables the vehicle to travel autonomously without depending on the driver's operation.

Furthermore, the microcomputer 12051 can output a control command to the body system control unit 12020 on the basis of the information on the outside of the vehicle acquired by the extra-vehicle information detection unit 12030. For example, the microcomputer 12051 can perform cooperative control for the purpose of anti-glare such as switching from high beam to low beam by controlling the head lamp depending on the position of a vehicle ahead or an oncoming vehicle detected by the extra-vehicle information detection unit 12030.

The sound-image output unit 12052 transmits an output signal of at least one of sound or image to an output device that can visually or aurally provide notification of information to a passenger of the vehicle or the outside of the vehicle. The example of FIG. 16 illustrates an audio speaker 12061, a display unit 12062, and an instrument panel 12063 as the output devices. The display unit 12062 may include at least one of an on-board display or a head-up display, for example.

Figure 17:
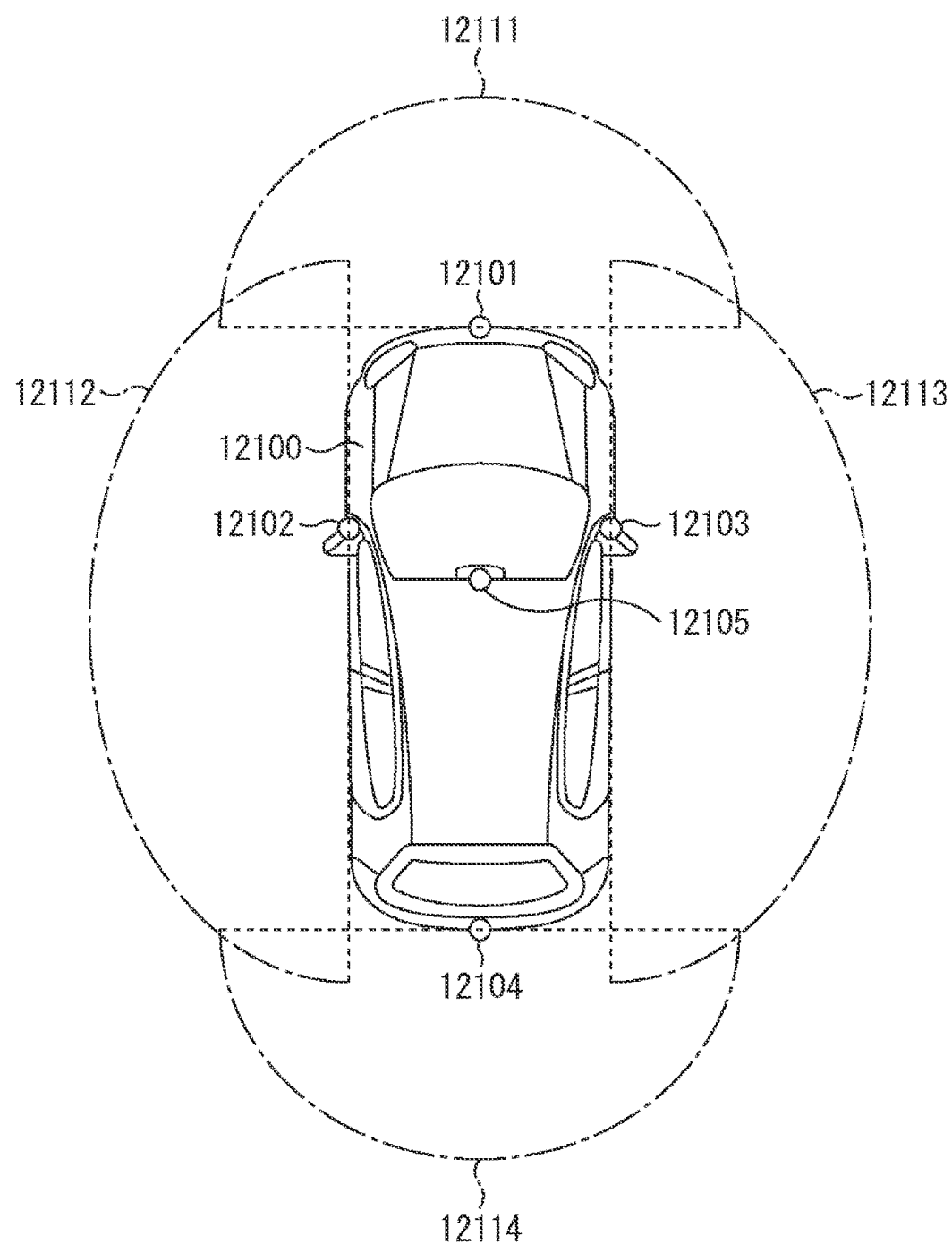
FIG. 17 is an explanatory diagram illustrating an example of the installation position of each of an extra-vehicle information detection unit and an imaging unit.

FIG. 17 is a diagram illustrating an example of the installation position of the imaging unit 12031.

In FIG. 17, a vehicle 12100 includes imaging units 12101, 12102, 12103, 12104, and 12105 as the imaging unit 12031.

The imaging units 12101, 12102, 12103, 12104, and 12105 are provided at positions such as a front nose, side mirrors, a rear bumper, a back door, and an upper part of the windshield in the passenger compartment of the vehicle 12100, for example. The imaging unit 12101 installed at the front nose and the imaging unit 12105 installed at the upper part of the windshield in the passenger compartment mainly acquire an image of an area ahead of the vehicle 12100. The imaging units 12102 and 12103 installed on the side mirrors mainly acquire images of areas around the sides of the vehicle 12100. The imaging unit 12104 installed on the rear bumper or the back door mainly acquires an image of an area behind the vehicle 12100. The image of the area ahead of the vehicle acquired by the imaging units 12101 and 12105 is mainly used for detecting a vehicle ahead, a pedestrian, an obstacle, a traffic light, a traffic sign, a lane, or the like.

Note that FIG. 17 illustrates an example of an imaging range of each of the imaging units 12101 to 12104. An imaging range 12111 indicates the imaging range of the imaging unit 12101 provided at the front nose, imaging ranges 12112 and 12113 indicate the imaging ranges of the corresponding imaging units 12102 and 12103 provided on the side mirrors, and an imaging range 12114 indicates the imaging range of the imaging unit 12104 provided on the rear bumper or the back door. For example, a bird's eye view image of the vehicle 12100 viewed from above is obtained by superimposing image data captured by the imaging units 12101 to 12104.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, on the basis of the distance information obtained from at least one of the imaging units 12101 to 12104, the microcomputer 12051 finds the distance to each three-dimensional object in at least one of the imaging ranges 12111 to 12114 and a temporal change in the distance (relative speed with respect to the vehicle 12100), thereby being able to particularly extract, as a vehicle ahead, a three-dimensional object closest on the path of travel of the vehicle 12100 and traveling at a predetermined speed (for example, 0 km/h or faster) in substantially the same direction as that of the vehicle 12100. Moreover, the microcomputer 12051 can set in advance the distance between vehicles to be secured behind a vehicle ahead, thereby being able to perform automatic brake control (including follow-up stop control), automatic acceleration control (including follow-up start control), and the like. The microcomputer can thus perform the cooperative control for the purpose of automated driving or the like that enables the vehicle to travel autonomously without depending on the driver's operation.

For example, on the basis of the distance information obtained from at least one of the imaging units 12101 to 12104, the microcomputer 12051 can classify three-dimensional object data associated with a three-dimensional object into a two-wheeled vehicle, a standard sized vehicle, a large sized vehicle, a pedestrian, and other three-dimensional objects such as a utility pole, and extract the data for use in automatic obstacle avoidance. For example, the microcomputer 12051 identifies an obstacle in the vicinity of the vehicle 12100 as an obstacle that can be visually recognized by the driver of the vehicle 12100 or an obstacle that cannot be easily visually recognized by the driver. Then, the microcomputer 12051 determines the risk of collision indicating the degree of risk of collision with each obstacle, and under circumstances where there is a possibility of collision with the risk of collision higher than or equal to a set value, the microcomputer can perform driver assistance to avoid collision by outputting an alarm co the driver via the audio speaker 12061 and/or the display unit 12062 or performing forced deceleration or evasive steering via the drive system control unit 12010.

At least one of the imaging units 12101 to 12104 may be an infrared camera for detecting infrared light. For example, the microcomputer 12051 can recognize a pedestrian by determining whether or not a pedestrian is present in an image captured by at least one of the imaging units 12101 to 12104. Such pedestrian recognition is performed by, for example, a procedure of extracting feature points in the image captured by at least one of the imaging units 12101 to 12104 as the infrared camera, and a procedure of performing pattern matching on a series of feature points indicating the outline of an object and determining whether or not the object corresponds to a pedestrian. If the microcomputer 12051 determines that a pedestrian is present in the image captured by at least one of the imaging units 12101 to 12104 and recognizes the pedestrian, the sound-image output unit 12052 controls the display unit 12062 such that a rectangular contour for emphasis is superimposed and displayed on the pedestrian being recognized. Furthermore, the sound-image output unit 12052 may also control the display unit 12062 to display an icon or the like indicating the pedestrian at a desired position.

An example of the vehicle control system to which the technology according to the present disclosure can be applied has been described above. The technology according to the present disclosure can be applied to the imaging unit 12031 and the like among the configurations described above. Specifically, for example, the ranging system 11 in FIG. 1 can be applied to the imaging unit 12031. The imaging unit 12031 includes LIDAR, for example, and is used for detecting an object around the vehicle 12100 and the distance to the object. The application of the technology according to the present disclosure to the imaging unit 12031 improves the accuracy of detecting the object around the vehicle 12100 and the distance to the object. As a result, for example, a vehicle collision warning can be issued at an appropriate timing to be able to prevent a traffic accident.

Note that in the present specification, the system refers to the assembly of a plurality of components (such as devices and modules (parts)), where it does not matter whether or not all the components are housed in the same housing. Accordingly, a plurality of devices housed in separate housings and connected through a network as well as a single device with a plurality of modules housed in a single housing are each a system.

Moreover, the embodiment of the present technology is not limited to the aforementioned embodiment but can be modified in various ways without departing from the scope of the present technology.

Note that the effect described in the present specification is provided by way of example and not by way of limitation, where there may be an effect other than that described in the present specification.

Note that the present technology can also be embodied in the following configurations.

(1)

A light receiving element including:
a pixel array in which a plurality of pixels each including an SPAD is arranged in a matrix;
a pixel drive unit that controls each pixel in the pixel array to be an active pixel or an inactive pixel;
a leakage current detection unit that detects a leakage current of the inactive pixel; and
a voltage control unit that controls a voltage supplied to a side of an anode or a side of a cathode of the SPAD such that the leakage current has a current value within a predetermined range.

(2)

The light receiving element according to (1) above, in which
the pixel further includes:
the SPAD;
a resistive component that is connected in series with the SPAD;
an output unit that outputs a detection signal indicating incidence of a photon on the SPAD; and
a switch that is turned on or off according to the control of the active pixel or the inactive pixel.

(3)

The light receiving element according to (1) or (2) above, in which the pixel further includes a switch that is turned on or off according to the control of the active pixel or the inactive pixel, the leakage current detection unit includes a resistor that is connected to the switch, and the voltage control unit controls the voltage supplied to the side of the anode of the SPAD.

(4)

The light receiving element according to (3) above, in which the voltage control unit includes an operational amplifier that receives the leakage current as one input, and the operational amplifier controls the voltage supplied to the side of the anode of the SPAD.

(5)

The light receiving element according to (3) above, in which the voltage control unit includes a comparator that receives the leakage current as one input, and controls the voltage supplied to the side of the anode of the SPAD depending on output of the comparator.

(6)

The light receiving element according to (1) or (2) above, in which the leakage current detection unit is connected to the side of the anode of the SPAD, and the voltage control unit controls the voltage supplied to the side of the anode of the SPAD.

(7)

The light receiving element according to (6) above, in which the leakage current detection unit includes a transistor.

(8)

The light receiving element according to (6) or (7) above, in which the pixel further includes a switch that is turned on or off according to the control of the active pixel or the inactive pixel, and the switch connects the anode of the SPAD to ground when turned on.

(9)

The light receiving element according to (1) or (2) above, in which the pixel further includes a switch that is turned on or off according to the control of the active pixel or the inactive pixel, the leakage current detection unit includes a resistor that is connected to the switch, and the voltage control unit controls the voltage supplied to the side of the cathode of the SPAD.

(10)

The light receiving element according to (9) above, in which the voltage control unit includes an operational amplifier that receives the leakage current as one input, and the operational amplifier controls the voltage supplied to the side of the cathode of the SPAD.

(11)

A ranging system including:

a lighting device that emits emitted light; and a light receiving element that receives reflected light of the emitted light, in which the light receiving element includes:

a pixel array in which a plurality of pixels each including an SPAD is arranged in a matrix;

a pixel drive unit that controls each pixel in the pixel array to be an active pixel or an inactive pixel;

a leakage current detection unit that detects a leakage current of the inactive pixel; and a voltage control unit that controls a voltage supplied to a side of an anode or a side of a cathode of the SPAD such that the leakage current has a current value within a predetermined range.

REFERENCE SIGNS LIST

11 Ranging system
21 Lighting device
22 Imaging device
31 Lighting control unit
32 Light source
41 Imaging unit
42 Control unit
52 Light receiving element
53 Signal processing circuit
111 Pixel drive unit
112 Pixel array
121, 121' Pixel
151 SPAD
152 Transistor
153 Switch
154 Inverter
157 Ground connection line
158 Power supply line
201 Leakage current detection unit
202 Anode power supply unit
211 Operational amplifier
212 Power supply
271 Leakage current detection unit
201 Cathode power supply unit
291 Operational amplifier
292 Power supply
301 Comparator
302 Power supply
303 Anode power supply unit
321 Anode power supply unit
331 Operational amplifier
332 Transistor
333 Power supply

The invention claimed is:

1. A light receiving element comprising:

a pixel array in which a plurality of pixels each including an SPAD arranged in a matrix;

a pixel drive unit that controls each pixel in the pixel array to be an active pixel or an inactive pixel;

a leakage current detection unit that detects a leakage current of the inactive pixel; and a voltage control unit that controls a voltage supplied to a side of an anode or a side of a cathode of the SPAD such that the leakage current has a current value within a predetermined range.

2. The light receiving element according to claim 1, wherein the pixel further comprises:

the SPAD;

a resistive component that is connected in series with the SPAD;

an output unit that outputs a detection signal indicating incidence of a photon on the SPAD; and a switch that is turned on or off according to the control of the active pixel or the inactive pixel.

3. The light receiving element according to claim 1, wherein
the pixel further comprises a switch that is turned on or off according to the control of the active pixel or the inactive pixel,
the leakage current detection unit includes a resistor that is connected to the switch, and
the voltage control unit controls the voltage supplied to the side of the anode of the SPAD.

4. The light receiving element according to claim 3, wherein
the voltage control unit includes an operational amplifier that receives the leakage current as one input, and
the operational amplifier controls the voltage supplied to the side of the anode of the SPAD.

5. The light receiving element according to claim 3, wherein
the voltage control unit includes a comparator that receives the leakage current as one input, and controls the voltage supplied to the side of the anode of the SPAD depending on output of the comparator.

6. The light receiving element according to claim 1, wherein
the leakage current detection unit is connected to the side of the anode of the SPAD, and
the voltage control unit controls the voltage supplied to the side of the anode of the SPAD.

7. The light receiving element according to claim 6, wherein
the leakage current detection unit includes a transistor.

8. The light receiving element according to claim 6, wherein
the pixel further comprises a switch that is turned on or off according to the control of the active pixel or the inactive pixel, and
the switch connects the anode of the SPAD to ground when turned on.

9. The light receiving element according to claim 1, wherein
the pixel further comprises a switch that is turned on or off according to the control of the active pixel or the inactive pixel,
the leakage current detection unit includes a resistor that is connected to the switch, and
the voltage control unit controls the voltage supplied to the side of the cathode of the SPAD.

10. The light receiving element according to claim 9, wherein
the voltage control unit includes an operational amplifier that receives the leakage current as one input, and
the operational amplifier controls the voltage supplied to the side of the cathode of the SPAD.

11. A ranging system comprising:
a lighting device that emits emitted light; and
a light receiving element that receives reflected light of the emitted light, wherein
the light receiving element comprises:
a pixel array in which a plurality of pixels each including an SPAD is arranged in a matrix;
a pixel drive unit that controls each pixel in the pixel array to be an active pixel or an inactive pixel;
a leakage current detection unit that detects a leakage current of the inactive pixel; and
a voltage control unit that controls a voltage supplied to a side of an anode or a side of a cathode of the SPAD such that the leakage current has a current value within a predetermined range.

* * * * *